(12) United States Patent
Hambardzumyan

(10) Patent No.: US 9,341,212 B2
(45) Date of Patent: May 17, 2016

(54) LOCKING ARM SYSTEM FOR A RETENTION RAMP OF A LIFT GATE

(71) Applicant: MAXON INDUSTRIES, INC., Santa Fe Springs, CA (US)

(72) Inventor: Levon Hambardzumyan, Glendale, CA (US)

(73) Assignee: Maxon Industries, Inc., Santa Fe Springs, CA (US)

( * ) Notice: Subject to any disclaimer, the term of this patent is extended or adjusted under 35 U.S.C. 154(b) by 504 days.

(21) Appl. No.: 13/689,582

(22) Filed: Nov. 29, 2012

(65) Prior Publication Data

US 2013/0136567 A1 May 30, 2013

Related U.S. Application Data

(60) Provisional application No. 61/565,454, filed on Nov. 30, 2011.

(51) Int. Cl.
*F16C 11/10* (2006.01)
*B60P 1/44* (2006.01)

(52) U.S. Cl.
CPC .............. *F16C 11/10* (2013.01); *B60P 1/4421* (2013.01); *B60P 1/4457* (2013.01); *B60P 1/4492* (2013.01); *Y10T 16/54026* (2015.01)

(58) Field of Classification Search
CPC .... B60P 1/4421; B60P 1/4457; B60P 1/4492; B60P 1/43
See application file for complete search history.

(56) References Cited

U.S. PATENT DOCUMENTS

| | | | | | |
|---|---|---|---|---|---|
| 5,449,267 | A | * | 9/1995 | Ablabutyan | 414/540 |
| 5,513,943 | A | * | 5/1996 | Lugash et al. | 414/545 |
| 5,683,221 | A | * | 11/1997 | Ablabutyan | 414/540 |
| 5,829,947 | A | * | 11/1998 | Litten | 414/537 |
| 6,802,095 | B1 | * | 10/2004 | Whitmarsh et al. | 14/71.3 |
| 2002/0197141 | A1 | * | 12/2002 | Cohn | 414/537 |
| 2012/0121369 | A1 | * | 5/2012 | Ablabutyan | 414/540 |

* cited by examiner

*Primary Examiner* — Ernesto Suarez
*Assistant Examiner* — Emery Hassan
(74) *Attorney, Agent, or Firm* — Brooks Acordia IP Law, P.C.; Michael Zarrabian

(57) ABSTRACT

The present invention provides a locking assembly for a ramp of a lift gate. The locking assembly comprises an elongated locking arm and a spring for spring loading the locking arm. The locking arm is pivotably disposed on a pivot point relative to the ramp. A biasing tension in the spring urges a proximal end of the locking arm to engage with a cam portion of the ramp to maintain the ramp in a selected position. The cam portion has multiple engagement surfaces for individually engaging with the locking arm, wherein selectively engaging the locking arm with each engagement surface of the cam portion maintains the ramp in a corresponding selected position.

24 Claims, 27 Drawing Sheets

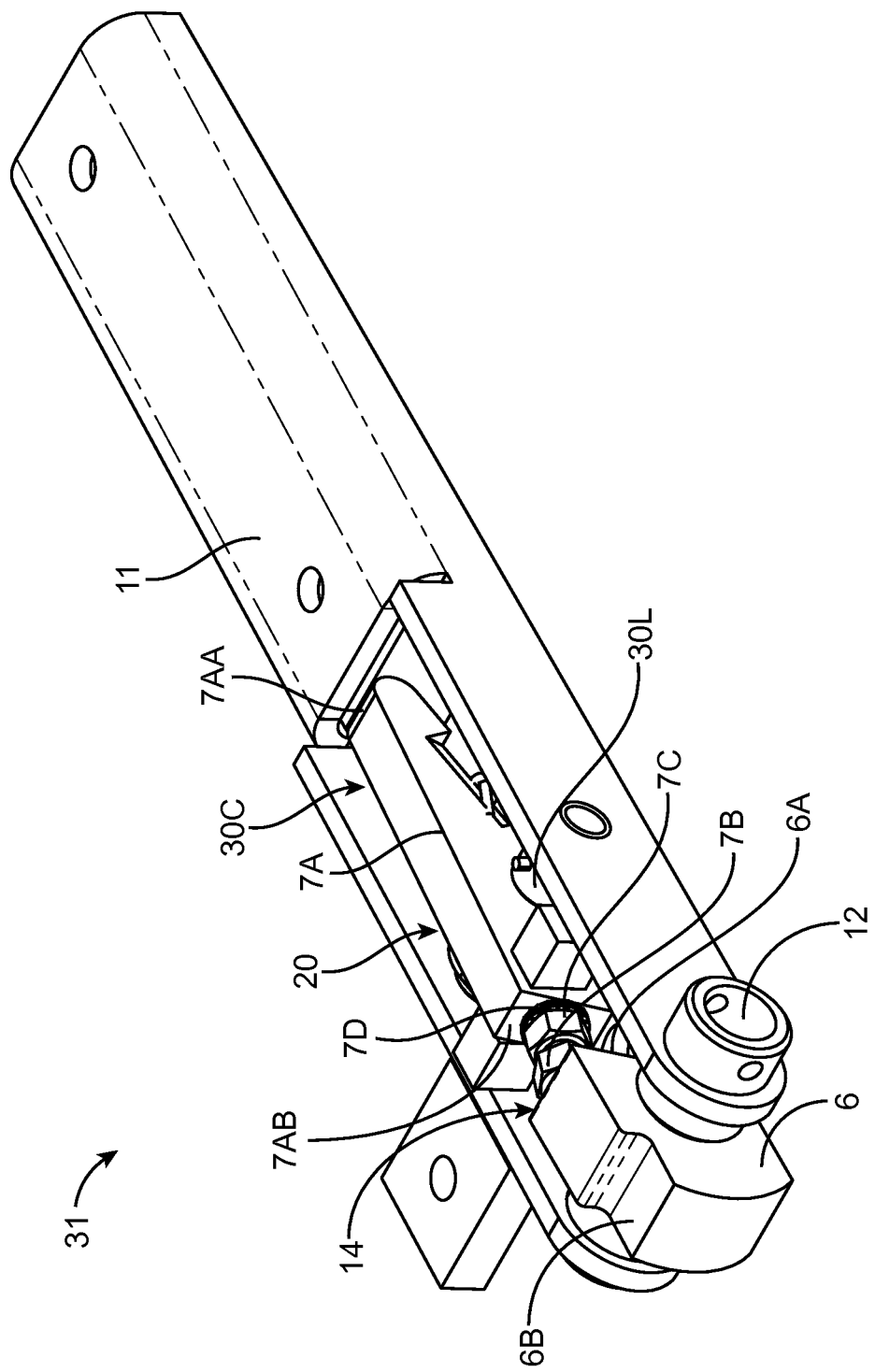

SECTION C-C

LOCKING ARM SYSTEM FOR A RETENTION RAMP OF A LIFT GATE

CROSS REFERENCE TO RELATED APPLICATIONS

This application claims the priority benefit of U.S. Provisional Patent Application Ser. No. 61/565,454 filed Nov. 30, 2011, incorporated herein by reference in its entirety.

BACKGROUND OF THE INVENTION

1. Field of the Invention

The present invention relates generally to lift gates, and in particular, to retention assemblies for ramps of lift gates.

2. Description of Related Art

Lifts such as lift gates are typically mounted at a structure such as an opening at the rear of a vehicle to lift payloads on a lift platform from one level (e.g., ground level) up to another level (e.g., the bed of the vehicle), or vice versa.

One type of lift gate employs a parallel pair of vertically extending standards, posts, or columns, each having a vertically disposed actuator for vertically raising and lowering a lift platform between ground level and the level of the bed of the vehicle. A collapsible linkage system interconnects the lift platform with the columns. The linkage system maintains the lift platform in a horizontal plane through the lifting range.

BRIEF SUMMARY OF THE INVENTION

The present invention provides a locking assembly for a retention ramp section of a lift gate. The locking assembly comprises an elongated locking arm and a spring for spring loading the locking arm. The locking arm is pivotably disposed on a pivot point relative to the ramp. A biasing tension in the spring urges a proximal end of the locking arm to engage with a cam portion of the ramp to maintain the ramp in a selected position. The cam portion has multiple engagement surfaces for individually engaging with the locking arm, wherein selectively engaging the locking arm with each engagement surface of the cam portion maintains the ramp in a corresponding selected position.

These and other features, aspects, and advantages of the present invention will become understood with reference to the following description, appended claims, and accompanying figures.

BRIEF DESCRIPTION OF THE DRAWINGS

FIG. 6A illustrates an example locking assembly with an adjustable locking arm, in accordance with an embodiment of the invention.

DETAILED DESCRIPTION OF THE INVENTION

Figure 1:
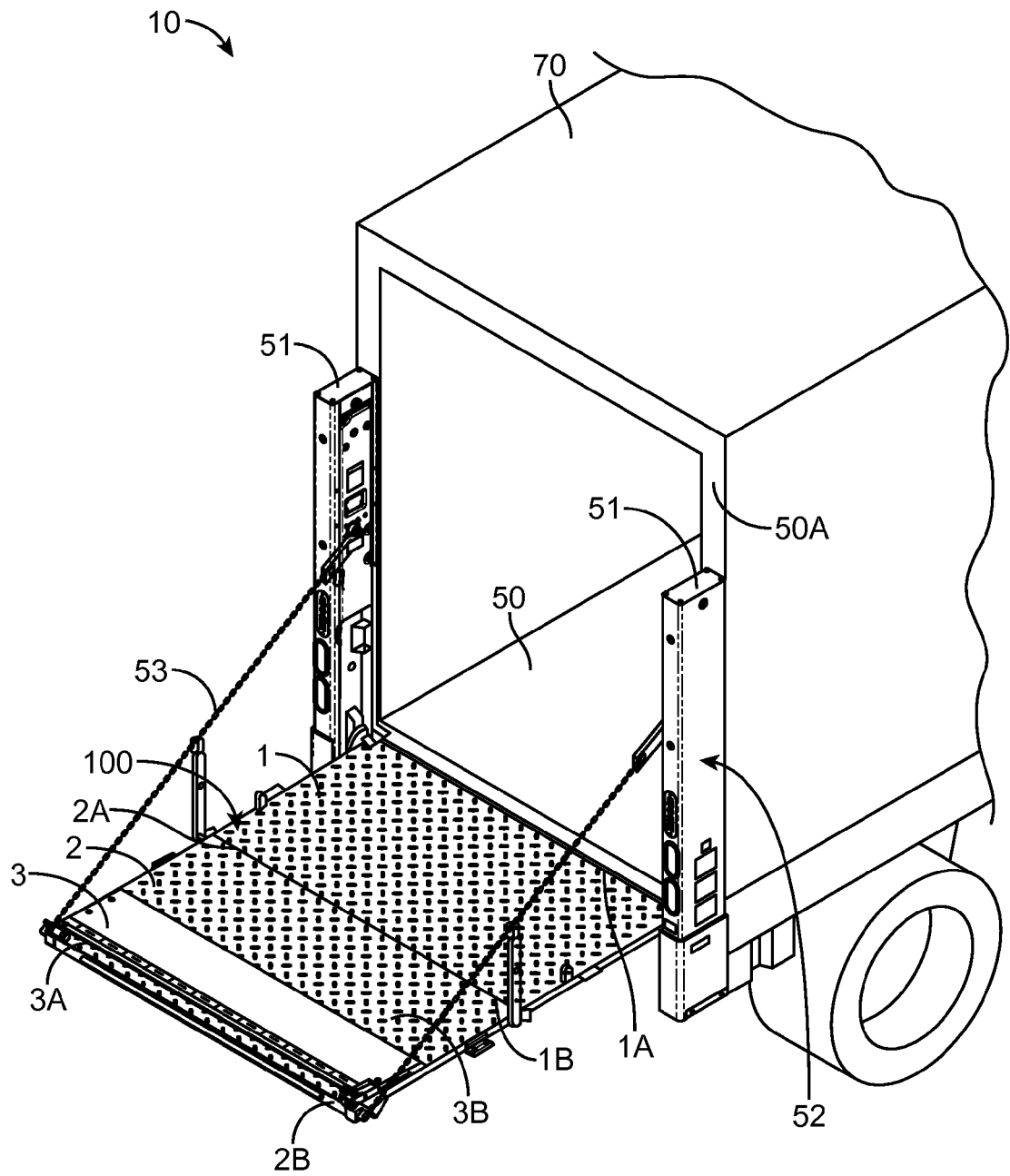
FIG. 1 illustrates a perspective view of a lift gate system, in accordance with an embodiment of the invention.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The present invention relates to retention assemblies for ramps of lift gates. In one embodiment, the present invention provides a retention device comprising a locking assembly for a ramp of a lift gate. The locking assembly comprises an elongated locking arm and a spring for spring loading the locking arm. The locking arm is pivotably disposed on a pivot point relative to the ramp. A biasing tension in the spring urges a proximal end of the locking arm to engage with a cam portion of the ramp to maintain the ramp in a selected position. The cam portion has multiple engagement surfaces for individually engaging with the locking arm, wherein selectively engaging the locking arm with each engagement surface of the cam portion maintains the ramp in a corresponding selected position. Upon exerting a force on the distal end of the locking arm to overcome the tension in the spring, the locking arm pivots to disengage said proximal end of the locking arm from the cam portion and allows the ramp to be rotated relative to the lift platform section.

In one embodiment, a coupling member rotatably couples the ramp to a lift platform section of the lift gate. The coupling member includes a channel in which the locking arm is pivotably disposed on a pivot axle along the length of the locking arm, such that the locking arm can pivot about the pivot axle for selectively engaging the cam portion. In one embodiment, the locking arm is pivotably disposed on said pivot axle along the length of the locking arm between the proximal end and a distal end of the locking arm.

In one embodiment, the ramp is maintained in a stowed position by engaging the proximal end of the locking arm with a first engagement surface of the cam portion, such that the ramp is folded against a section of the lift platform section. The ramp is maintained in a retention position by engaging the proximal end of the locking arm with a second engagement surface of the cam portion, such that the ramp is substantially transverse to the lift platform section. The ramp is maintained in a ramp position by engaging the proximal end of the locking arm with a third engagement surface of the cam portion, such that the ramp is substantially aligned with the lift platform section.

Upon exerting a force on the distal end of the locking arm to overcome the tension in the spring, the locking arm pivots to disengage said proximal end of the locking arm from the cam portion and allows the ramp to be rotated relative to the lift platform section between said stowed position, retention position and ramp position. The distal end of the locking arm rotates into said channel as the proximal end of the locking arm rotates away to disengage the cam portion due to exertion of said force on the distal end of the locking arm. Upon removing said force on the distal end of the locking arm, the spring pivots the locking arm to rotate said proximal end into engagement with the cam portion and maintain the ramp in a selected position relative to the lift platform section. A bottom of the channel limits the rotational range of the distal end of the locking arm.

In one embodiment, the locking arm further includes an adjustment mechanism for adjusting the length of the locking arm. The adjustment mechanism is disposed on said proximal end of the locking arm, such that the adjustment mechanism allows selective adjustment of the length of a portion of the locking arm between said pivot point and the cam portion. The adjustment mechanism allows adjusting the length of the locking arm to reduce a gap between the proximal end of the locking arm and an engagement surface of the cam portion. When the proximal end of the locking arm engages with a first engagement surface of the cam portion, the ramp is maintained in a stowed position by the locking arm, such that the ramp is folded against a section of the lift platform section. The adjustment mechanism allows adjusting the length of the locking arm for engaging the cam portion to maintain the ramp fully folded against the lift platform section in said stowed position of the ramp.

In one embodiment, the adjusting mechanism comprises an adjustable screw threadedly disposed on said proximal end of the locking arm for engaging the cam portion. The length of the locking arm can be increased by partially unscrewing the adjustable screw out of said proximal end of the locking arm. The length of the locking arm can be decreased by partially screwing the adjustable screw into said proximal end of the locking arm.

FIG. 1 illustrates a perspective view of a lift gate system ("lift gate") 10, in accordance with an embodiment of the invention. The lift gate 10 is configured for mounting at a structure such as a rear frame of a vehicle (e.g., a truck). For example, the lift gate 10 may be attached to a rear frame 50A of a vehicle 70 as shown in FIG. 1.

The lift gate 10 comprises a lifting mechanism 52 including a parallel pair of vertically extending columns 51 for moving a lift platform 100 between a raised position and a lowered position. Each column 51 includes a vertically disposed actuator therein for vertically raising and lowering the lift platform 100, such as between ground level 200 (FIG. 2B) and the level of a vehicle bed 50 of the vehicle 70. A pair of collapsible linkages 53 interconnects the lift platform 100 with the columns 51 along linkage points on sides of the lift platform 100. The linkages 53 maintain the lift platform 100 in a horizontal plane through the lifting range. In one embodiment, a cam 6 (FIG. 3) is a portion of a retention ramp section ("ramp") 3 of the lift platform 100. In another embodiment, the cam 6 is fixedly attached to the ramp 3 via fastening devices such as screws or by welding.

The columns 51 raise/lower the lift platform 100 for lifting payloads thereon from one level (e.g., ground level 200 in FIG. 2B) to another level (e.g., the vehicle bed 50 of the vehicle 70), or vice versa. In FIG. 1, the lift platform 100 is shown in an unfolded position, wherein the lift platform 100 is substantially aligned with the vehicle bed 50 when the lift platform 100 is in the raised position, as shown in FIG. 1.

The lift platform 100 comprises at least one load-carrying surface including a platform section 1, a foldable section ("flipover") 2, and the ramp 3.

The platform section 1 has a first edge 1A and a second edge 1B that is opposite of the first edge 1A. The flipover 2 has a first edge 2A and a second edge 2B that is opposite of the first edge 2A. The first edge 2A of the flipover 2 is pivotally coupled to the second edge 1B of the platform section 1.

The ramp 3 has a first edge 3A and a second edge 3B that is opposite of the first edge 3A. The first edge 3A of the ramp 3 is pivotally coupled to the second edge 2B of the flipover 2 via at least one locking assembly 30 (FIG. 3) or at least one locking assembly 31 (FIG. 6A). In one embodiment, the first edge 3A of the ramp 3 is pivotally coupled to the second edge 2B of the flipover 2 via a locking assembly 30 at one side and a hinge assembly 40 at another side (FIG. 2B), wherein the locking assembly 30 and the hinge assembly 40 are disposed at opposite ends (sides) 3E (FIG. 15) and 3F (FIG. 15), respectively, of the first edge 3A. In another embodiment, the first edge 3A of the ramp 3 is pivotally coupled to the second edge 2B of the flipover 2 via a locking assembly 31 at one side and a hinge assembly 40 at another side (FIG. 15), wherein the locking assembly 31 and the hinge assembly 40 are disposed at opposite ends (sides) 3E (FIG. 15) and 3F (FIG. 15), respectively, of the first edge 3A. In yet another embodiment, the first edge 3A of the ramp 3 is pivotally coupled to the second edge 2B of the flipover 2 via a pair of locking assemblies 31 (FIG. 16), wherein each locking assembly 31 is disposed at an opposite end 3E (FIG. 16), 3F (FIG. 16) of the first edge 3A.

The ramp 3 is connected to a coupling member that comprises a hinge member 11 for rotatably coupling the ramp 3 to the flipover 2. The coupling member further includes a pivot member 12 (FIG. 3) such as an axle pin for rotatably disposing the hinge member 11 relative to the flipover 2, thereby enabling the hinge member 12 (and the attached ramp 3) to freely rotate relative to the flipover 2 when the locking assembly is unlocked, as described herein.

Figure 2A:
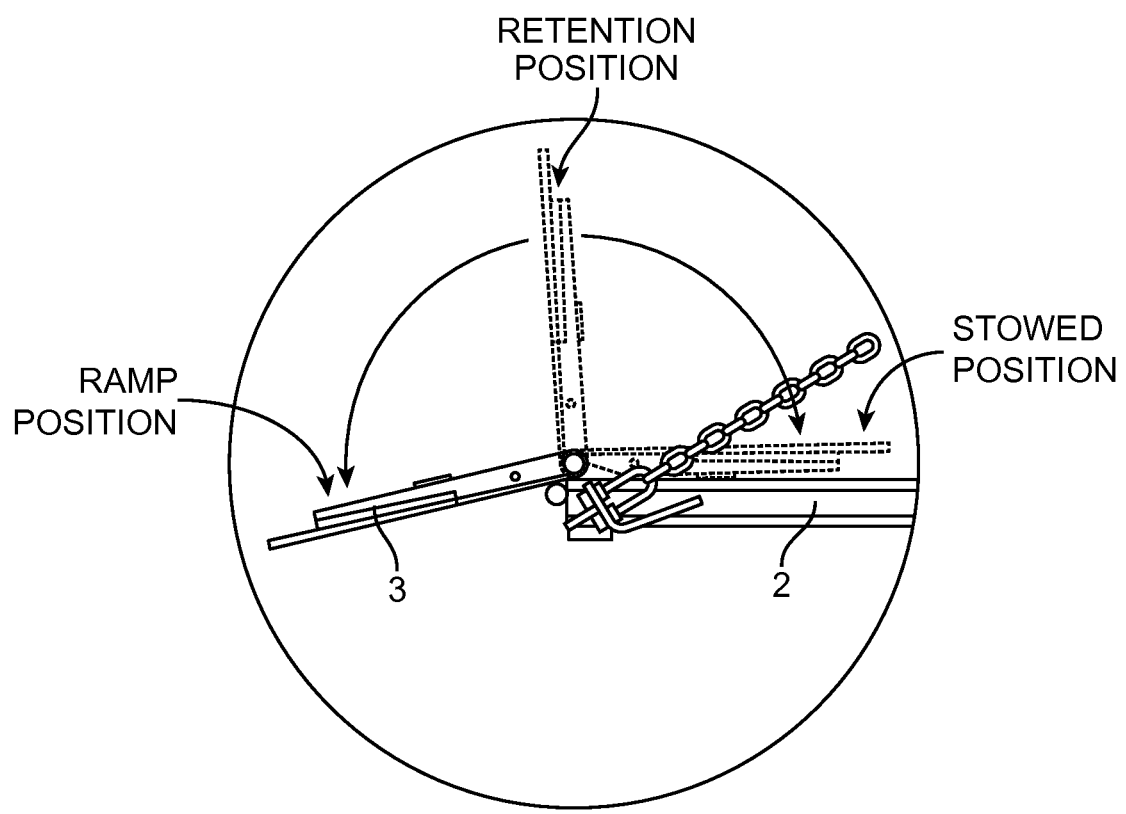
FIG. 2A illustrates the pivoting range of the ramp relative to the flipover, in accordance with an embodiment of the invention.

FIG. 2A illustrates the pivoting range of the ramp 3 relative to the flipover 2, in accordance with an embodiment of the invention. The ramp 3 pivots relative to the flipover 2. Each locking assembly 30, 31 that pivotally couples the ramp 3 to the flipover 2 maintains (i.e., locks) the ramp 3 in a selected position. In one embodiment, the ramp 3 may be maintained (i.e., locked) in a ramp position, a retention position, or a stowed position.

As shown in FIG. 2A, in the ramp position, the ramp 3 is lowered and substantially aligned with the flipover 2. In the retention position, the ramp 3 is raised and substantially transverse (i.e., perpendicular) to the flipover 2. In the stowed position, the ramp 3 is folded over and against the flipover 2.

Figure 2B:
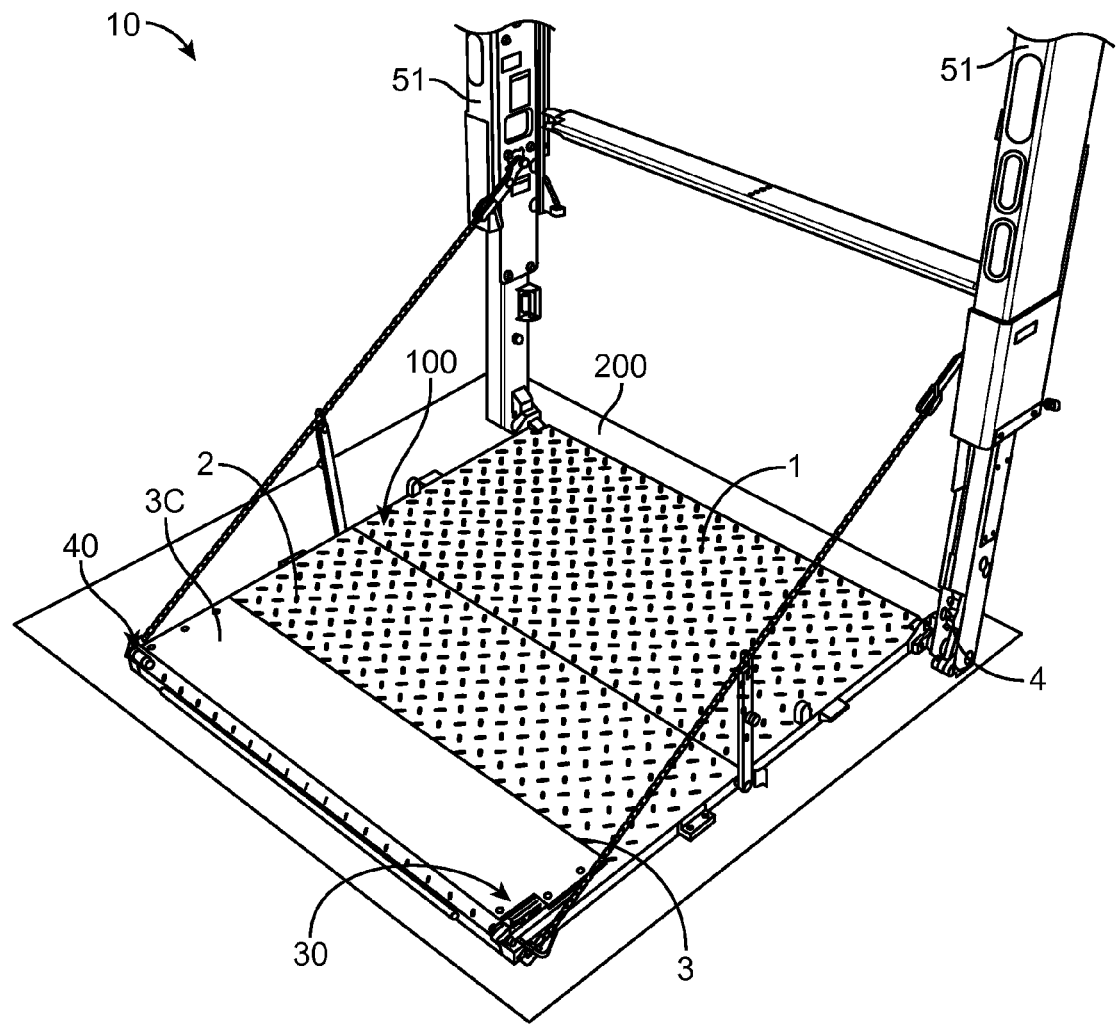
FIG. 2B illustrates the lift platform in the lowered position and the ramp maintained in the stowed position, in accordance with an embodiment of the invention.

FIG. 2B illustrates the lift platform 100 in the lowered position and the ramp 3 maintained in the stowed position, in accordance with an embodiment of the invention. In one embodiment, the lift platform 100 rests against a ground level 200 when the lift platform 100 is in the lowered position for placing loads thereon. The platform section 1 and the flipover 2 are unfolded and in substantial horizontal alignment with the ground level 200. When the lift platform 100 is in the lowered position, the ramp 3 may be maintained in the ramp position to function as a ramp, in the retention position to prevent objects from rolling off the edge of the flipover 2, or in the stowed position, as shown in FIG. 2B. The ramp 3 is folded over and against the flipover 2 when the ramp 3 is maintained in the stowed position, as shown in FIG. 2B.

Figure 2C:
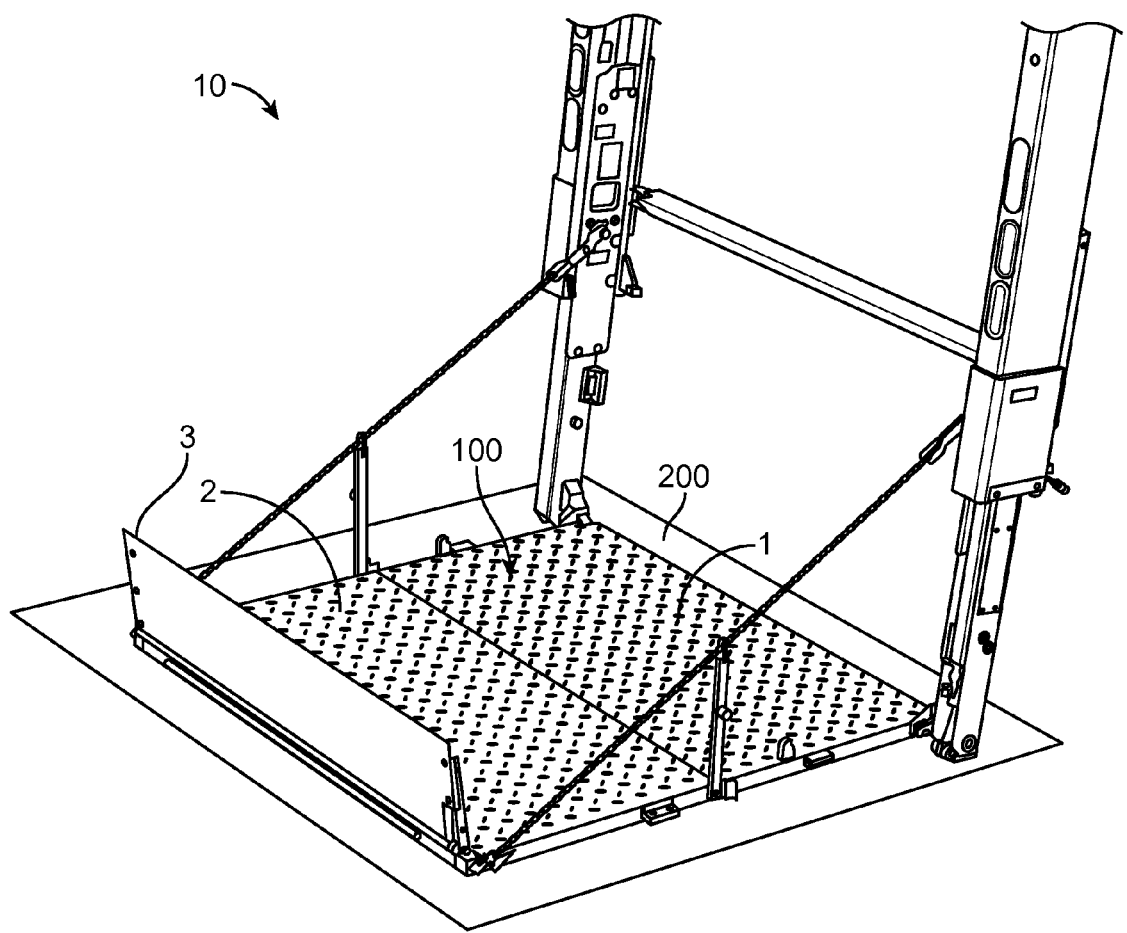
FIG. 2C illustrates the lift platform in the lowered position and the ramp maintained in the retention position, in accordance with an embodiment of the invention.

FIG. 2C illustrates the lift platform 100 in the lowered position and the ramp 3 maintained in the retention position, in accordance with an embodiment of the invention. The ramp 3 is raised and substantially transverse (i.e., perpendicular) to the flipover 2 when the ramp 3 is maintained in the retention position, as shown in FIG. 2C. In the retention position, the ramp 3 prevents loads (e.g., wheeled carts) from rolling off the lift platform 100.

Figure 2D:
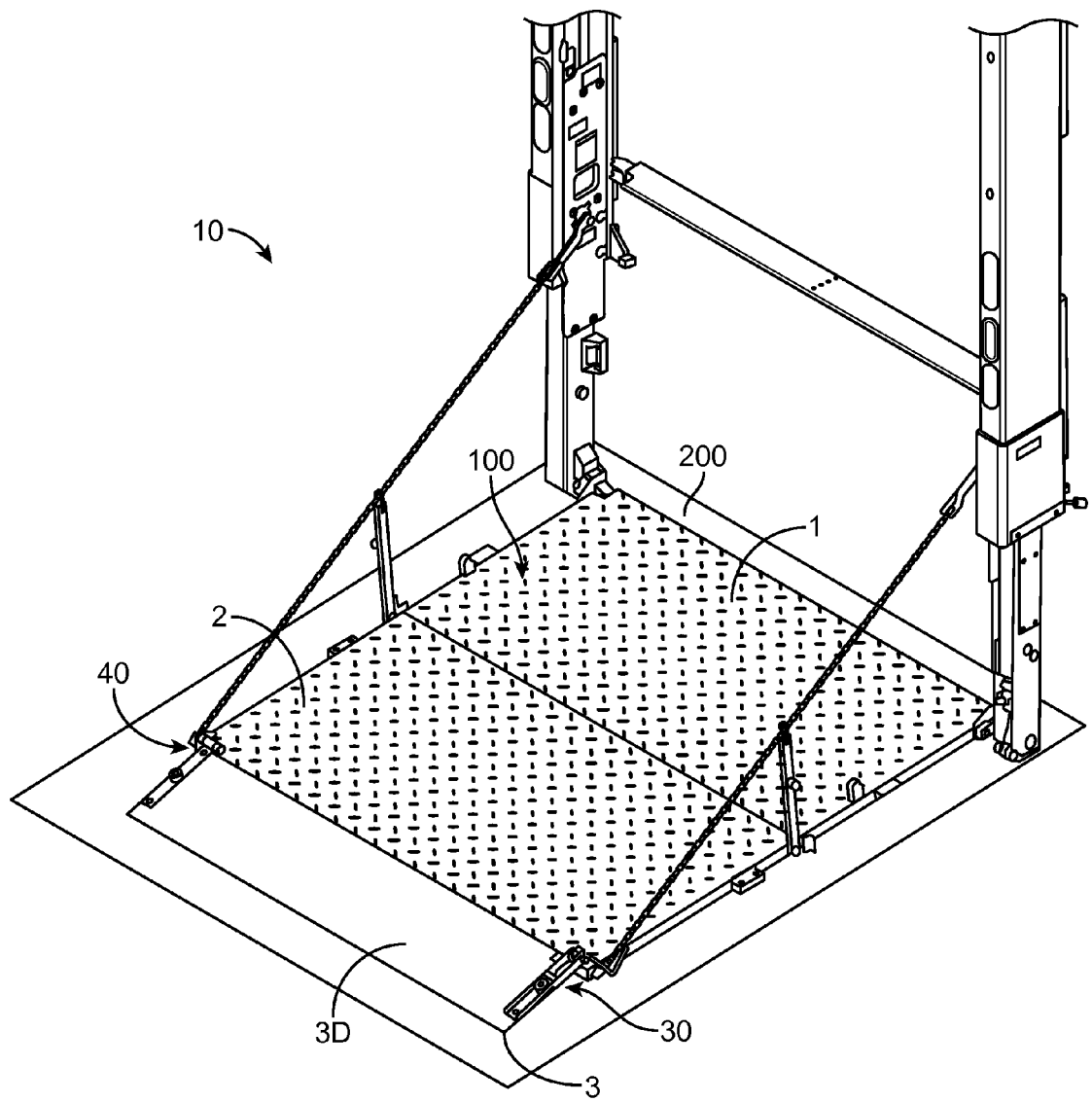
FIG. 2D illustrates the lift platform in the lowered position and the ramp maintained in the ramp position, in accordance with an embodiment of the invention.

FIG. 2D illustrates the lift platform 100 in the lowered position and the ramp 3 maintained in the ramp position, in accordance with an embodiment of the invention. The ramp 3 is lowered and substantially aligned with the flipover 2 when the ramp 3 is maintained in the ramp position, as shown in FIG. 2D. In the ramp position, loads (e.g., wheeled carts) may be more easily rolled onto, or rolled off, the lift platform 100. The ramp 3 comprises a bottom side 3C (FIG. 2B) and a top side 3D.

Figure 3:
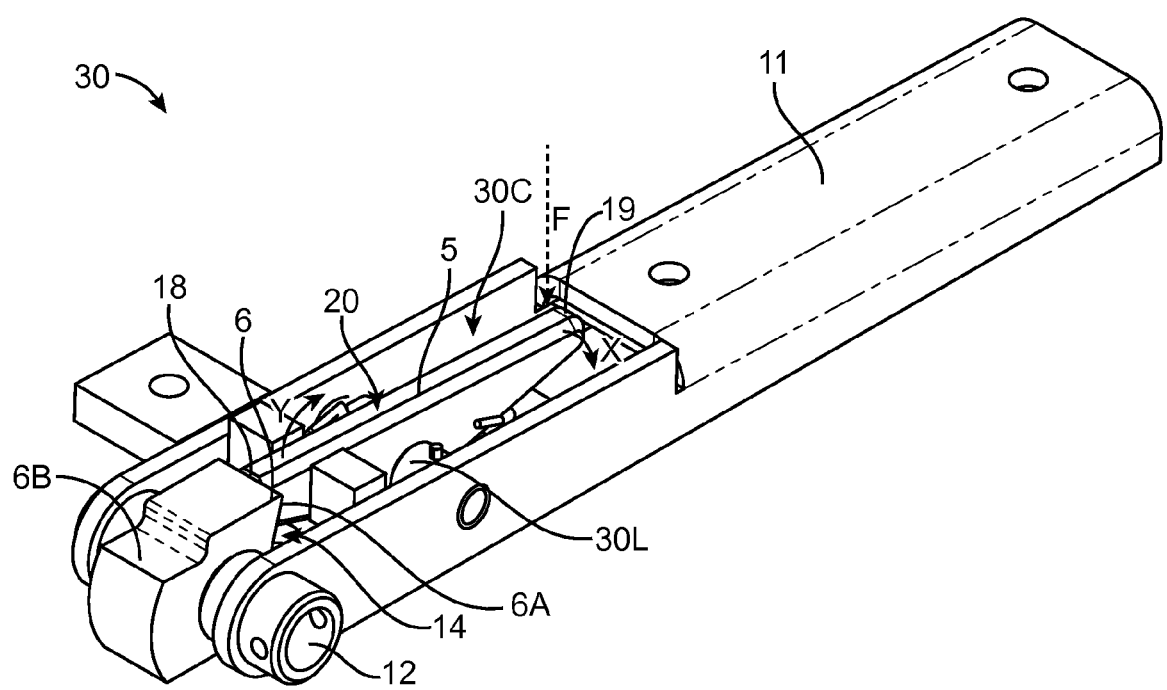
FIG. 3 illustrates an example locking assembly, in accordance with an embodiment of the invention.
Figure 13A:
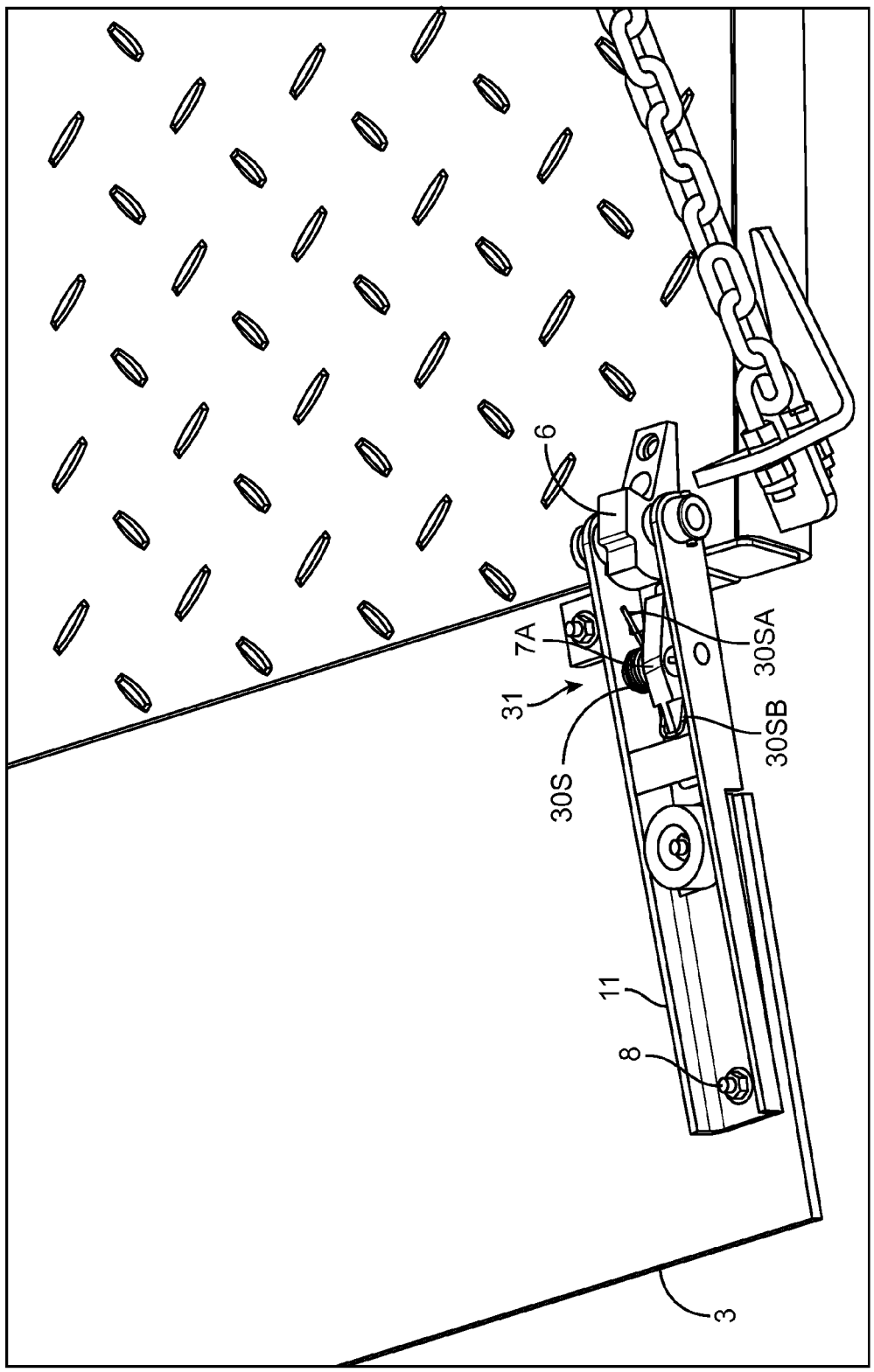
FIG. 13A illustrates a top perspective view of the ramp when the ramp is maintained in the ramp position, in accordance with an embodiment of the invention.

FIG. 3 illustrates an embodiment of a locking assembly 30, in accordance with an embodiment of the invention. The locking assembly 30 further comprises a hinge arm member ("hinge member") 11 coupled to the top side 3D of the ramp 3 using at least one fastener 8 (FIG. 13A). The hinge member 11 includes a channel (i.e., cavity) 30C.

The locking assembly 30 further comprises a locking mechanism 20 for maintaining the pivoting ramp 3 in a selected position (e.g., a ramp position, a retention position, or a stowed position) when the locking assembly 30 is locked. The locking mechanism 20 is disposed within the channel 30C of the hinge member 11. In one embodiment, the locking mechanism 20 comprises an elongated locking arm member ("locking arm") 5, a spring coil 30S (FIG. 6B), and a pivot axle 30L disposed on the opposing walls of the channel 30C.

A cam member/portion ("cam") 6 is fixedly attached to the flipover 2, such that the hinge member 11 (and the attached ramp 3) is rotatable on pivot member 12 relative to the cam 6 (and the flipover 2) when the locking assembly 30 is unlocked.

The elongated locking arm 5 has a first end 18 and a second end 19 that is distal from the first end 18. In relation to the cam 6, the first end 18 and the second end 19 of the locking arm 5 are the proximal end 18 and the distal end 19 of the locking arm 5, respectively.

The cam 6 includes different portions or locking engagement surfaces for engaging with the first end 18 of the locking arm 5 to lock the locking assembly 30 and maintain the ramp 3 in a selected position. The locking arm 5 is pivotably mounted on the pivot axle 30L, such that the locking arm 5 pivots on the axle 30L in relation to the channel 30C of the hinge member 11. The spring coil 30S is a torsion spring which is disposed concentric with the pivot axle 30L, with one end engaging the locking arm 5 and another end engaging a portion of the channel 30C. The spring coil 30S is normally in torsion and pivots the locking arm 5 on the axle 30L to move the proximal end 18 of the locking arm 5 downwardly into the channel 30C and urged onto the cam 6. As such, the spring 30S always exerts a biasing force on the locking arm 5 such that the first end 18 of the locking arm 5 is spring-loaded on the cam 6.

The ramp 3 is maintained in a selected position when the locking arm 5 engages with an engagement surface of the cam 6 to lock the locking assembly 30. For example, the ramp 3 is maintained in the stowed position when the proximal end 18 of the locking arm 5 engages a first recess portion ("first recess") 14 (FIG. 13B) of the cam 6, as shown in FIG. 3. The proximal end 18 is in direct contact (i.e., flush) with engagement surface 6A of the first recess 14 of the cam 6 when the ramp 3 is maintained in the stowed position. This prevents rotation of the hinge member 11 and the attached ramp 3 on the pivot member 12 away from the flipover 2, thereby maintaining the ramp 3 in the stowed position.

To release (i.e., unlock) the ramp 3 from a selected position, a force F is applied to the distal end 19 of the locking arm 5 to overcome the biasing torsion of the spring 30S and push the distal end 19 downward into the channel 30C of the hinge member 11. As the distal end 19 rotates inside the channel 30C in direction X (e.g., clockwise in FIG. 3), the proximal end 18 of the locking arm 5 disengages from the first recess 14 of the cam 6 and rotates away from the cam 6 in direction Y (e.g., clockwise in FIG. 3).

Generally, when the proximal end 18 of the locking arm 5 is disengaged from the cam 6, this unlocks the locking assembly 30 and the ramp 3 is free to rotate relative to the flipover 2 on the pivot member 12 while the force F is maintained on the locking arm 5 to maintain the proximal end 18 of the locking arm 5 disengaged from the cam 6. For example, an operator can rotate the ramp 3 relative to the flipover 2.

Figure 4A:
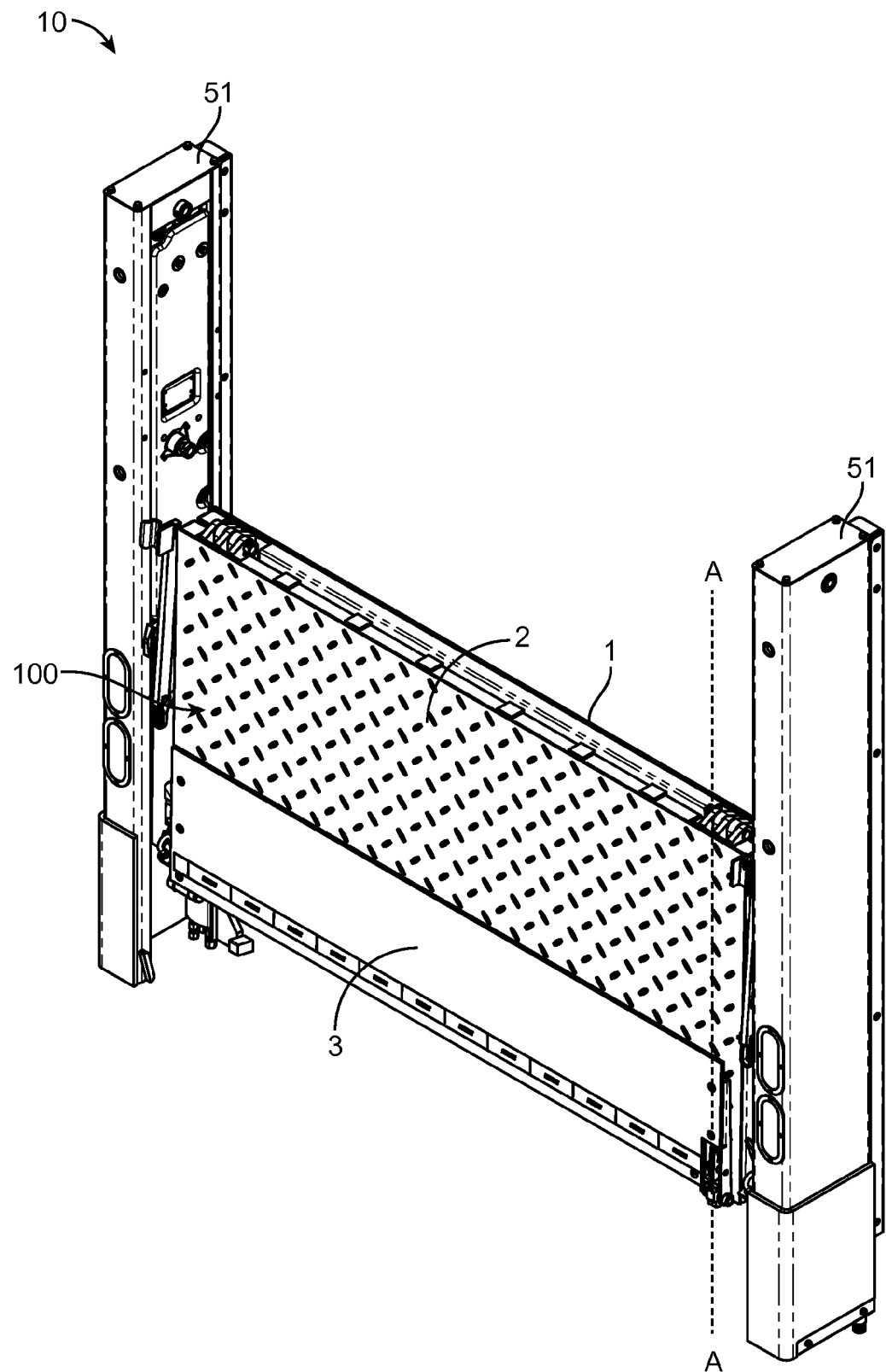
FIG. 4A illustrates a side perspective view of the lift platform in the stowed position, in accordance with an embodiment of the invention.

FIG. 4A shows a perspective view of the lift gate 10, wherein the lift platform 100 is in folded and stowed position between the columns 51, and the ramp 3 is maintained in the stowed position relative to the flipover 2 by the locking arm 5, in accordance with an embodiment of the invention. As noted, the lifting mechanism 52 comprises a parallel pair of vertically extending standards, posts or columns 51, each having a vertically disposed actuator 4 (FIG. 2B) for vertically raising and lowering the lift platform 100 between ground level 200 and the vehicle bed 50. The linkages 53 (e.g., chains) maintain the lift platform 100 in a horizontal plane through the lifting range of the platform 100. The lifting mechanism 52 may also rotate the lift platform 100 into a stowed position, as shown in FIG. 4A. In the stowed position, the lift platform 100 is fully-folded, inverted, and vertically disposed between the columns 51.

Figure 4B:
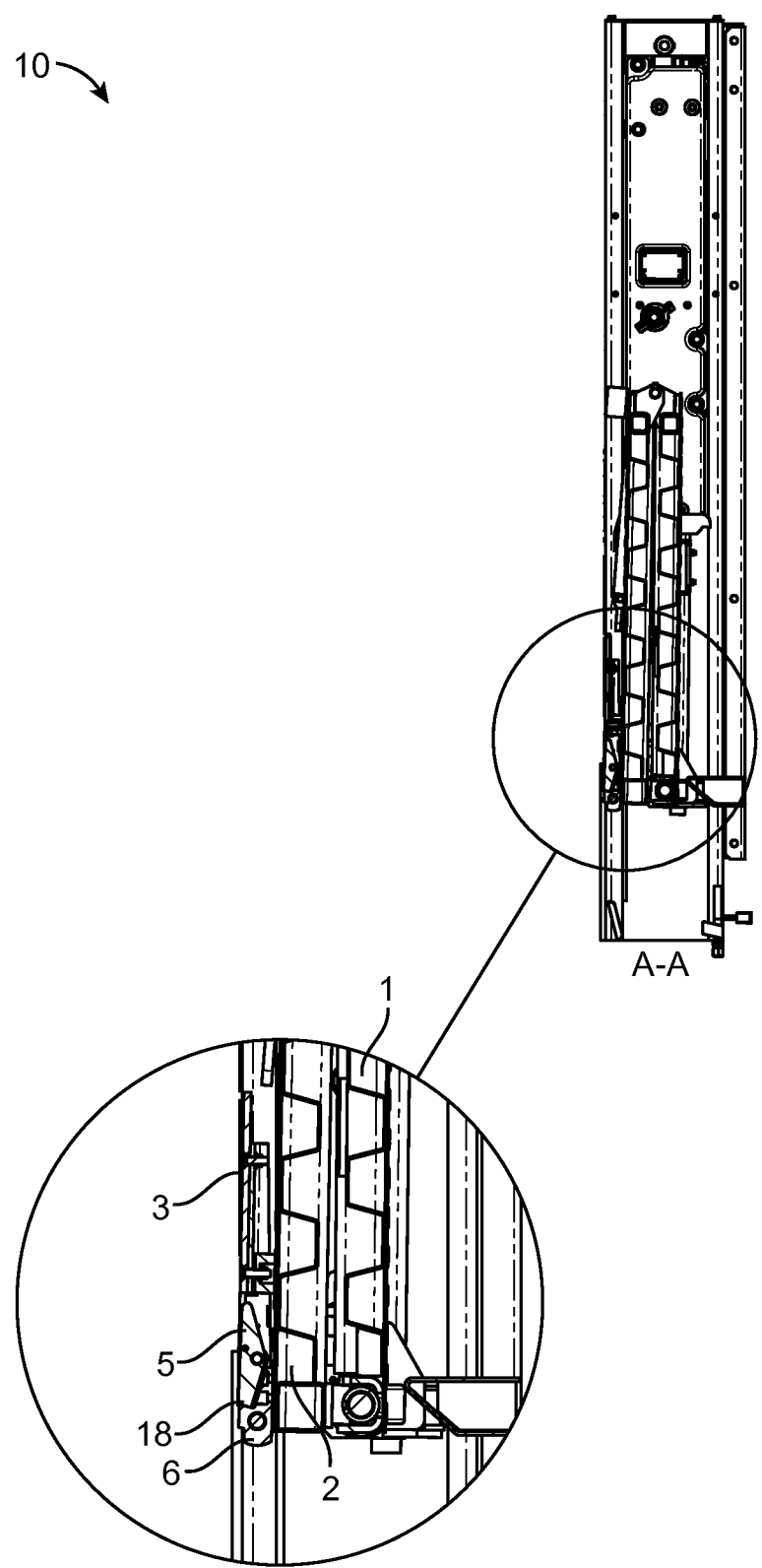
FIG. 4B illustrates a cross-sectional view of the lift gate in FIG. 4A about an axis A-A (FIG. 4A), in accordance with an embodiment of the invention.

FIG. 4B illustrates a cross-sectional view of the lift platform 100 in FIG. 4A about an axis A-A (FIG. 4A), in accordance with an embodiment of the invention. As shown in FIGS. 4A-4B, the flipover 2 is folded against the platform section 1 of the folded lift platform 100, and the ramp 3 is maintained by the locking arm 5 of the locking assembly 30 in the stowed position (i.e., folded against the flipover 2). The proximal end 18 of the locking arm 5 is in direct contact (i.e., flush) with recess 14 of the cam 6 to maintain (i.e., lock) the ramp 3 in the stowed position.

Repeatedly engaging the locking arm 5 with the cam 6 to maintain the ramp 3 in a selected position may cause wear and tear to the proximal end 18 of the locking arm 5 and/or the cam 6. Further, repeatedly disengaging the locking arm 5 from the cam 6 to release the ramp 3 from a selected position may also cause wear and tear to the proximal end 18 of the locking arm 5 and/or the cam 6.

Figure 5A:
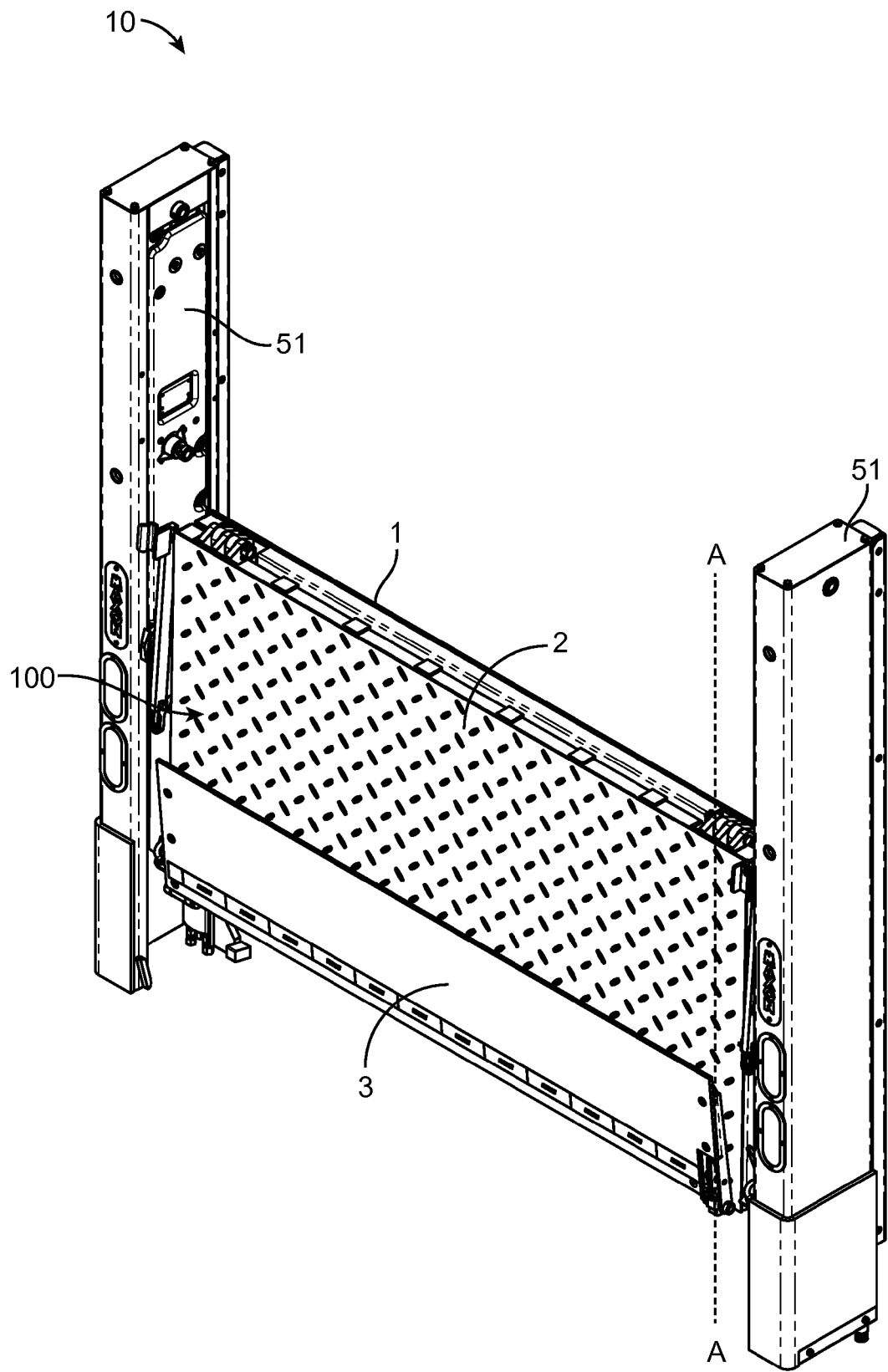
FIG. 5A illustrates a side perspective view of the lift gate in the stowed position after the lift gate has been used for a period of time, in accordance with an embodiment of the invention.
Figure 5B:
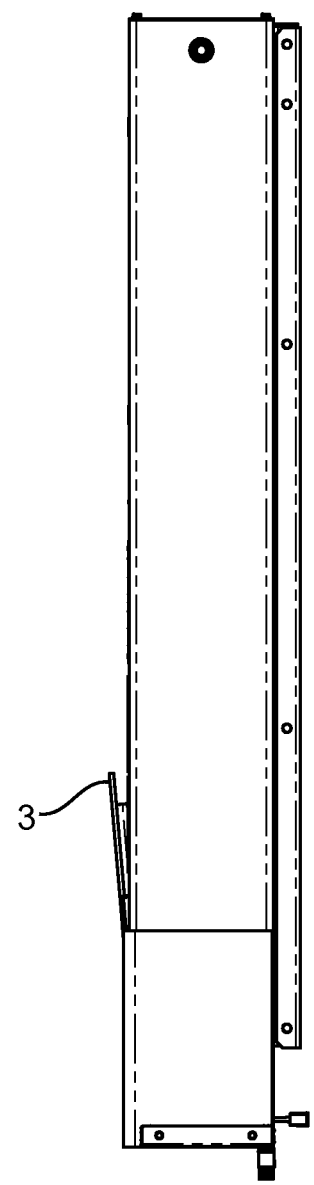
FIG. 5B illustrates a side view of the lift gate in FIG. 5A, in accordance with an embodiment of the invention.

As a result of such wear and tear to the locking assembly 30, over time the locking arm 5 may not properly engage the cam 6 to properly maintain the ramp 3 in a selected position. FIG. 5A illustrates a perspective view of the lift platform 100 in the stowed position after the lift gate 10 (FIG. 1) has been used for a period of time, causing wear and tear on the locking arm 5 and/or the locking engagement surfaces of the cam 6. FIG. 5B illustrates a side view of the lift platform 100 in FIG. 5A, wherein the ramp 3 is not properly maintained in the stowed position against the flipover 2 due to wear and tear on the locking arm 5 and/or the cam 6.

Figure 5C:
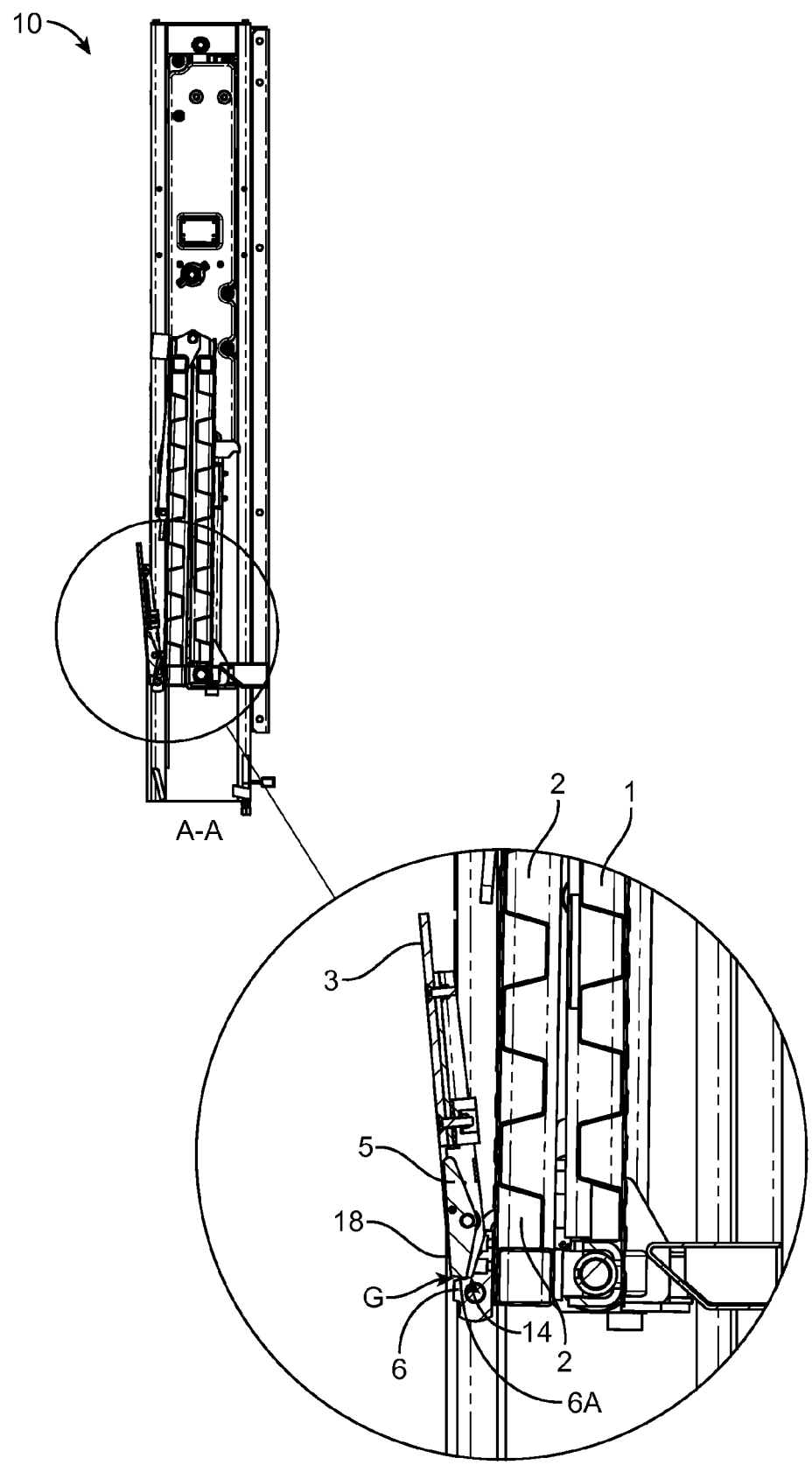
FIG. 5C illustrates a cross-sectional view of the lift gate in FIG. 5A about an axis A-A (FIG. 5A), in accordance with an embodiment of the invention.

FIG. 5C illustrates a cross-sectional view of the lift platform 100 in FIG. 5A about an axis A-A (FIG. 5A), wherein wear and tear wear on the locking arm 5 and/or the cam 6 resulted in a gap G between the proximal end 18 of the locking arm 5 and the locking engagement surface 6A of the cam 6. The gap G prevents the proximal end 18 of the locking arm 5 from properly engaging with the first recess 14 of the cam 6 to maintain the ramp 3 properly stowed against the flipover 2. As a result, the ramp 3 may jut out relative to the flipover 2 even when the ramp 3 is maintained in the stowed position, as shown in FIGS. 5A-5C. This is distinguishable from FIGS. 4A-4B where the ramp 3 is properly folded flat against the flipover 2 when the ramp 3 is maintained in the stowed position. The gap G may be minimized or closed by replacing the worn out locking arm 5 or the worn out cam 6 with a new locking arm 5 or a new cam 6, respectively.

According to another embodiment of the invention shown in FIG. 6A, a locking assembly 31 includes an adjustable locking arm 7A that allows reducing such a gap G as necessary. The locking assembly 31 is similar to the locking assembly 30, except that the adjustable locking arm 7A is used in the locking assembly 31 instead of the locking arm 5 of the locking assembly 30. The adjustable locking arm 7A has a first end 7AA and a second end 7AB that is opposite of the first end 7AA. In relation to the cam 6, the first end 7AA and the second end 7AB of the adjustable locking arm 7A are the distal end 7AA and the proximal end 7AB of the adjustable locking arm 7A, respectively. The cam 6 is fixedly attached to the flipover 2, such that the hinge member 11 (and the attached ramp 3) is rotatable on pivot member 12 relative to the cam 6 (and the flipover 2) when the locking assembly 31 is unlocked.

In one embodiment, the elongated adjustable locking arm 7A includes an adjusting mechanism for adjusting the length of the adjustable locking arm 7A. The adjusting mechanism allows selectively adjusting the length of the arm 7A between the axle 30L and the cam 6. In one implementation, the adjusting mechanism comprises an adjustable screw member 7B, a portion of which is threadedly driven inside the adjustable locking arm 7A at the proximal end 7AB of the adjustable locking arm 7A, allowing adjustments to the length of the adjustable locking arm 7A. An adjustment may be made by unscrewing the screw 7B to lengthen the arm 7A, or further screwing in the screw 7B to shorten the length of the arm 7A.

The cam 6 includes locking engagement surfaces for engaging the adjustable screw 7B of the adjustable locking arm 7A in different positions relative to the cam 6. The spring coil 30S exerts a biasing force on the adjustable locking arm 7A such that the adjustable screw 7B and the proximal end 7AB of the adjustable locking arm 7A are spring-loaded towards the cam 6. As described in detail later herein, the ramp 3 is maintained in a selected position when the adjustable screw 7B of the adjustable locking arm 7A engages an engagement surface (i.e., a locking surface) of the cam 6.

Figure 6B:
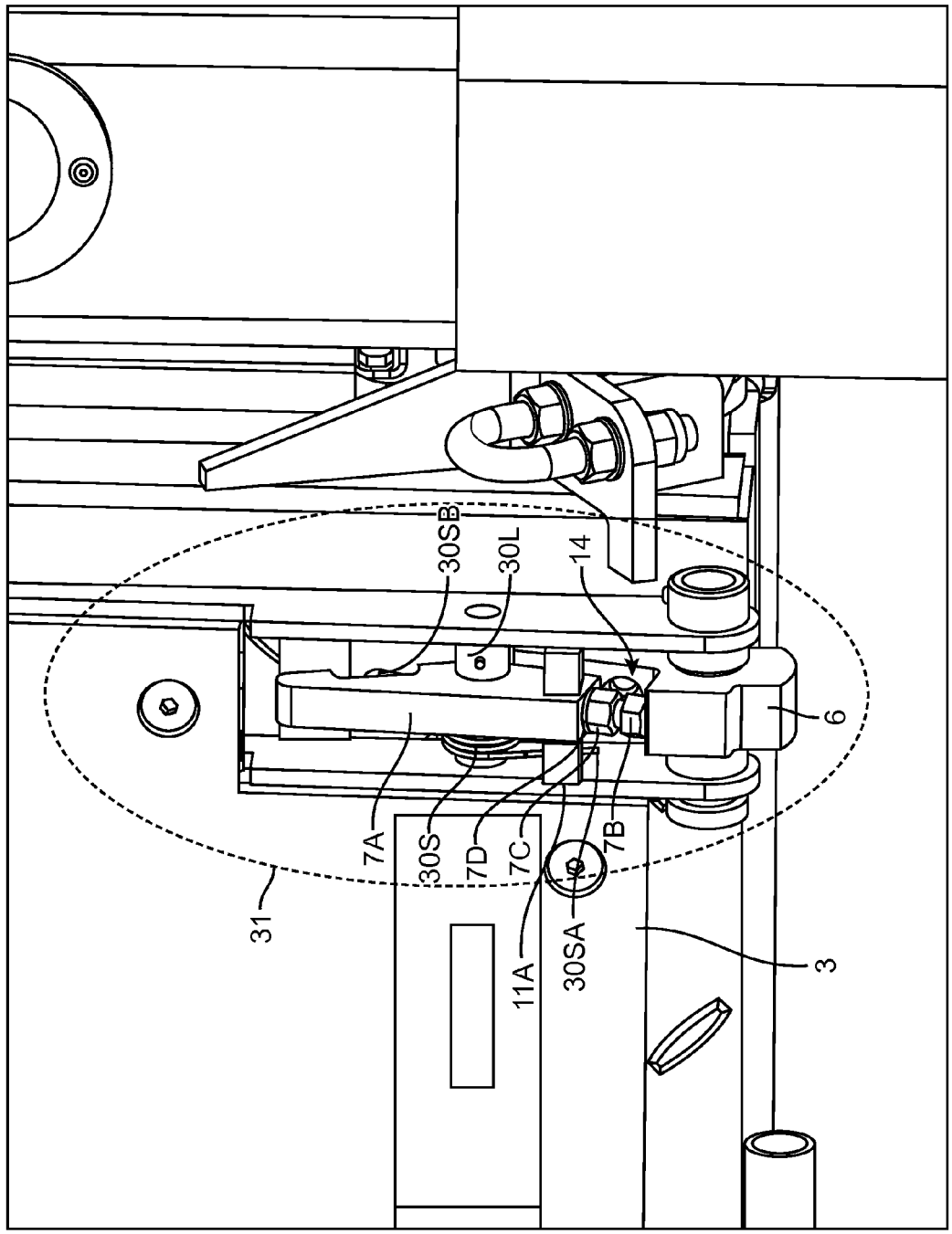
FIG. 6B illustrates an example locking assembly with an adjustable locking arm, wherein the ramp is maintained in the stowed position, in accordance with an embodiment of the invention.

FIG. 6B illustrates the locking assembly 31, wherein the ramp 3 is maintained in the stowed position against the flipover 2, in accordance with an embodiment of the invention. As shown in FIG. 6B, the adjustable screw 7B engages engagement surface 6A of the first recess 14 of the cam 6 to maintain the ramp 3 in the stowed position. A first end 30SA of the torsion spring coil 30S is fixedly attached to a protrusion 11A of the hinge member 11. A second end 30SB of the torsion spring coil 30S is fixedly attached to a recess 7R (FIG. 7I) of the adjustable locking arm 7A. In this manner, the proximal end 7AB of the arm 7A is spring-loaded against the cam 6. The spring coil 30S governs the rotational range of the adjustable locking arm 7A, as described above in relation of the locking assembly 30.

Figure 7A:
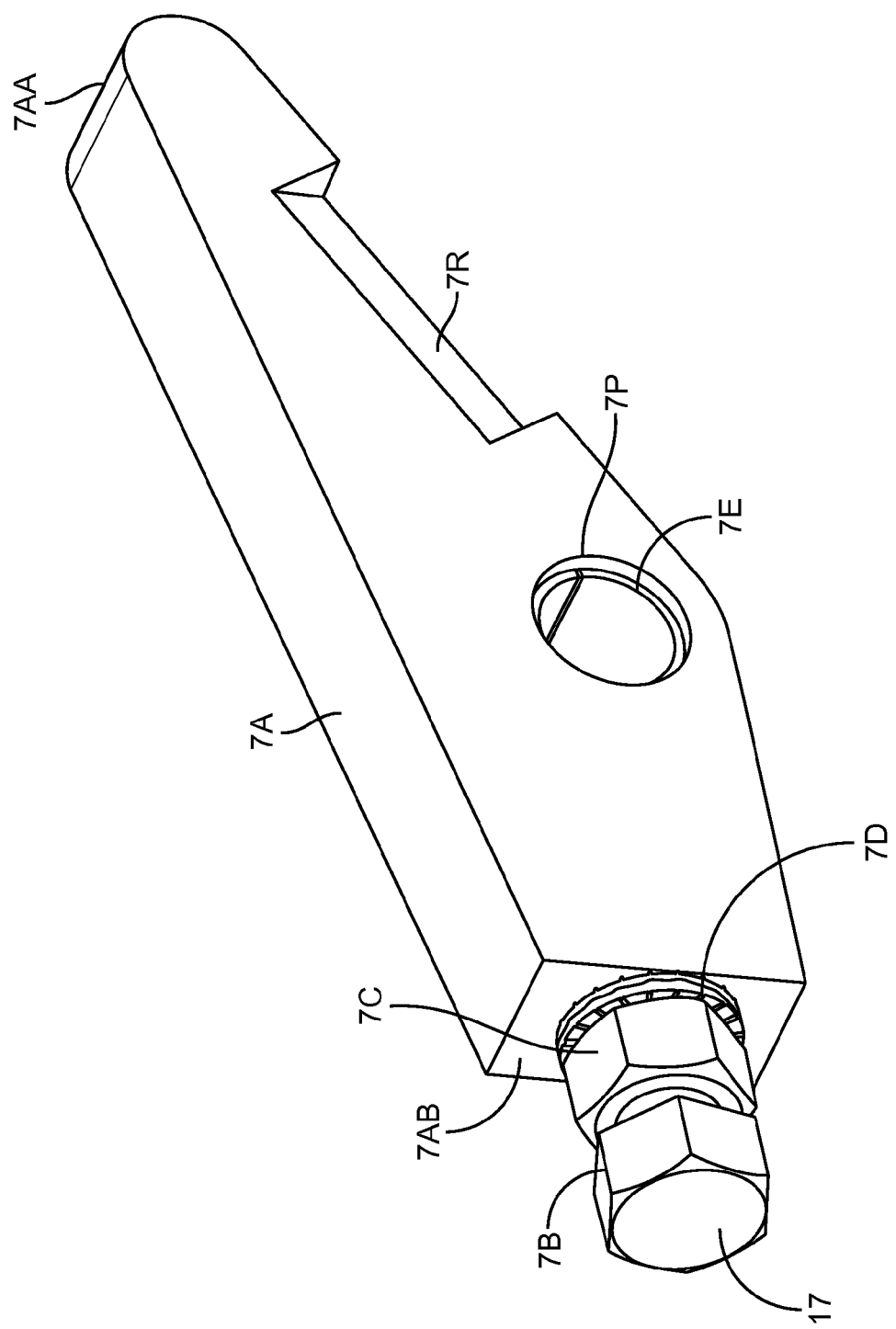
FIG. 7A illustrates a top perspective view of the adjustable locking arm, in accordance with an embodiment of the invention.
Figure 7B:
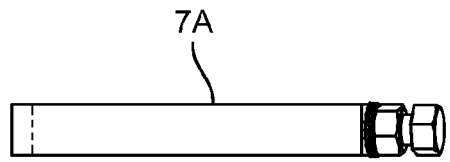
FIG. 7B illustrates a top view of the adjustable locking arm, in accordance with an embodiment of the invention.
Figure 7C:
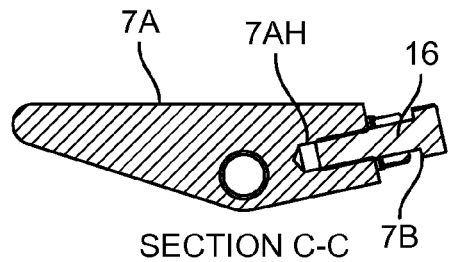
FIG. 7C illustrates a cross-sectional view of the adjustable locking arm, in accordance with an embodiment of the invention.
Figure 7D:
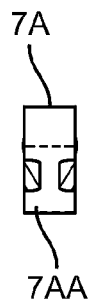
FIG. 7D illustrates a back view of the adjustable locking arm, in accordance with an embodiment of the invention.
Figure 7E:
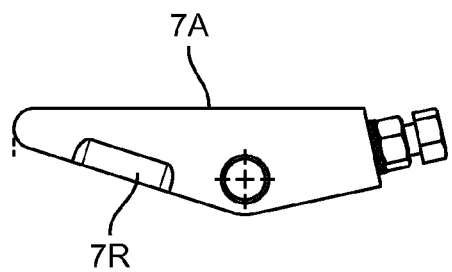
FIG. 7E illustrates a side view of the adjustable locking arm, in accordance with an embodiment of the invention.
Figure 7F:
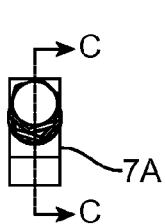
FIG. 7F illustrates a front view of the adjustable locking arm, in accordance with an embodiment of the invention.
Figure 7G:
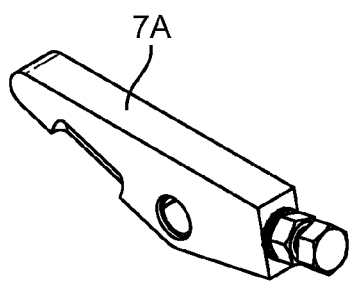
FIG. 7G illustrates a front perspective view of the adjustable locking arm, in accordance with an embodiment of the invention.
Figure 7H:
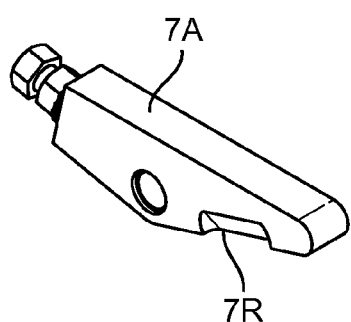
FIG. 7H illustrates a back perspective view of the adjustable locking arm, in accordance with an embodiment of the invention.
Figure 7I:
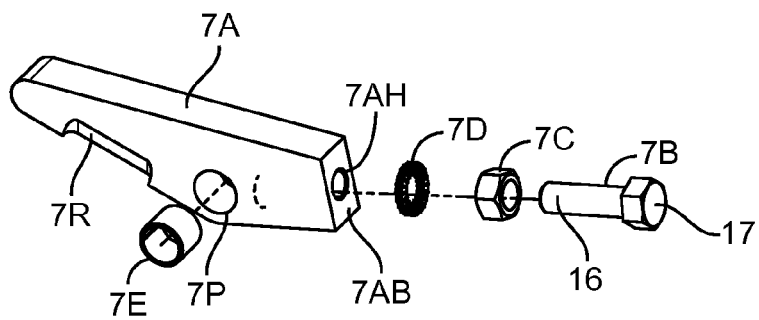
FIG. 7I illustrates an exploded view of the adjustable locking arm, in accordance with an embodiment of the invention.

FIGS. 7A-7I illustrate different views of the adjustable locking arm 7A of the locking assembly 31, in accordance with an embodiment of the invention. Specifically, FIG. 7A illustrates a perspective view of the adjustable locking arm 7A, apart from the hinge member 11. FIG. 7B illustrates a top view of the adjustable locking arm 7A. FIG. 7C illustrates a cross-sectional view of the adjustable locking arm 7A. FIG. 7D illustrates a back view of the adjustable locking arm 7A. FIG. 7E illustrates a side view of the adjustable locking arm 7A. FIG. 7F illustrates a front view of the adjustable locking arm 7A. FIG. 7G illustrates a front perspective view of the adjustable locking arm 7A. FIG. 7H illustrates a back perspective view of the adjustable locking arm 7A. FIG. 7I illustrates an exploded view of the adjustable locking arm 7A.

The proximal end 7AB of the arm 7A includes a threaded cavity 7AH for threadedly receiving the adjustable screw 7B. The adjustable screw 7B has a threaded body 16 (FIG. 7B) and a head 17. A portion of the body 16 is threadedly driven (i.e., screwed) inside the cavity 7AH of the adjustable locking arm 7A. In one embodiment, a securing nut 7C and a washer 7D further secure the adjustable screw 7B to the adjustable locking arm 7A. The securing nut 7C may be loosened to adjust the adjustable screw 7B. For example, the securing nut 7C may be loosened to screw the body 16 of the adjustable screw 7B further inside the cavity 7AH of the adjustable locking arm 7A (i.e., shorten the arm 7A). The securing nut 7C may also be loosened to unscrew the body 16 of the adjustable screw 7B out of the cavity 7AH of the adjustable locking arm 7A (i.e., lengthen the arm 7A).

An aperture 7P extends axially through the adjustable locking arm 7A. The aperture 7P is shaped for receiving a bearing 7E, wherein the bearing 7E receives the pivot axle (pin) 30L for assembling the arm 7A on the hinge member 11. The adjustable locking arm 7A is mounted on the pivot axle 30L (FIG. 6A) by inserting the pivot axle 30L through the bearing 7E.

The locking arm 7A further includes a recess 7R. As noted, the second end 30SB of the torsion spring coil 30S is fixedly attached to the recess 7R.

Figure 8A:
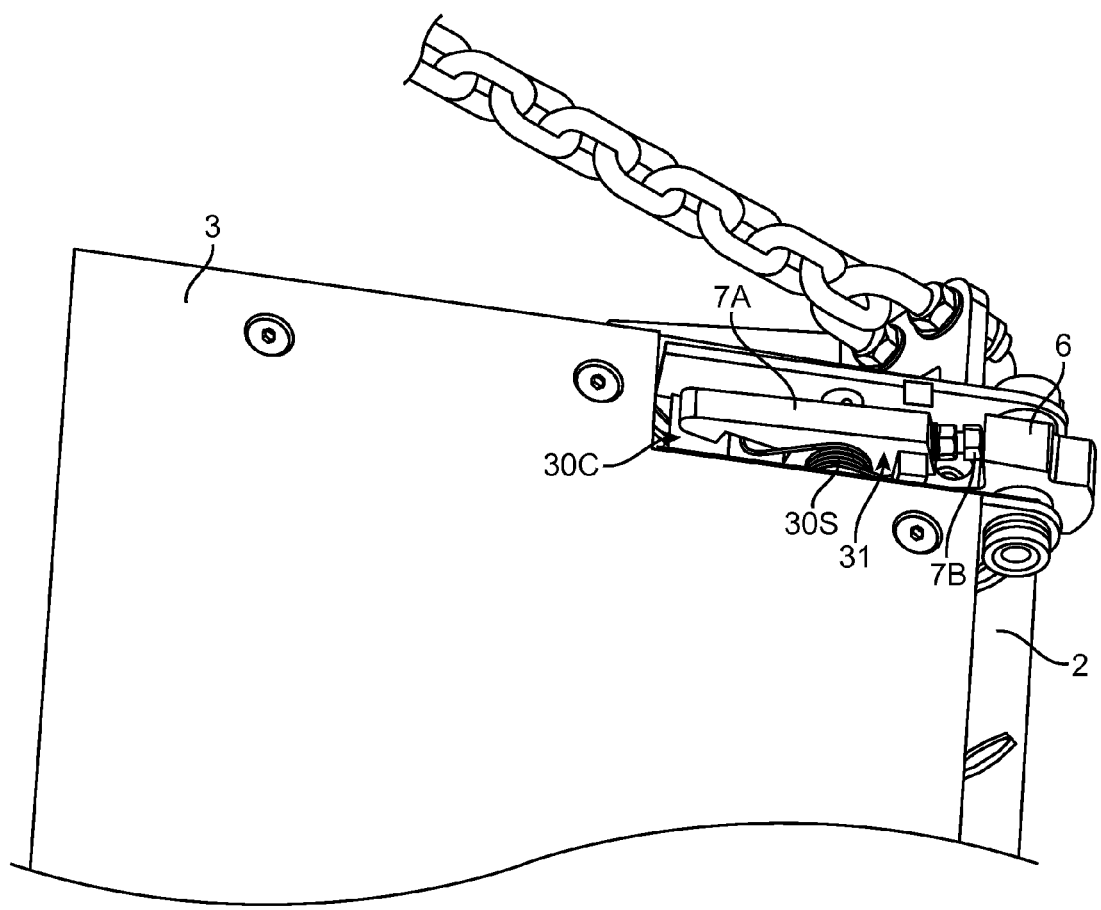
FIG. 8A illustrates a top perspective view of the ramp when the ramp is maintained in the stowed position, in accordance with an embodiment of the invention.

FIG. 8A illustrates a top perspective view of the ramp 3 and the locking mechanism 31, wherein the ramp 3 is maintained in the stowed position, in accordance with an embodiment of the invention. As noted, the ramp 3 is in the stowed position when the ramp 3 is folded over and against the flipover 2. The ramp 3 is maintained in the stowed position when the adjustable screw 7B of the arm 7A engages with the first recess 14 of the cam 6, as shown in FIG. 8A.

Figure 8B:
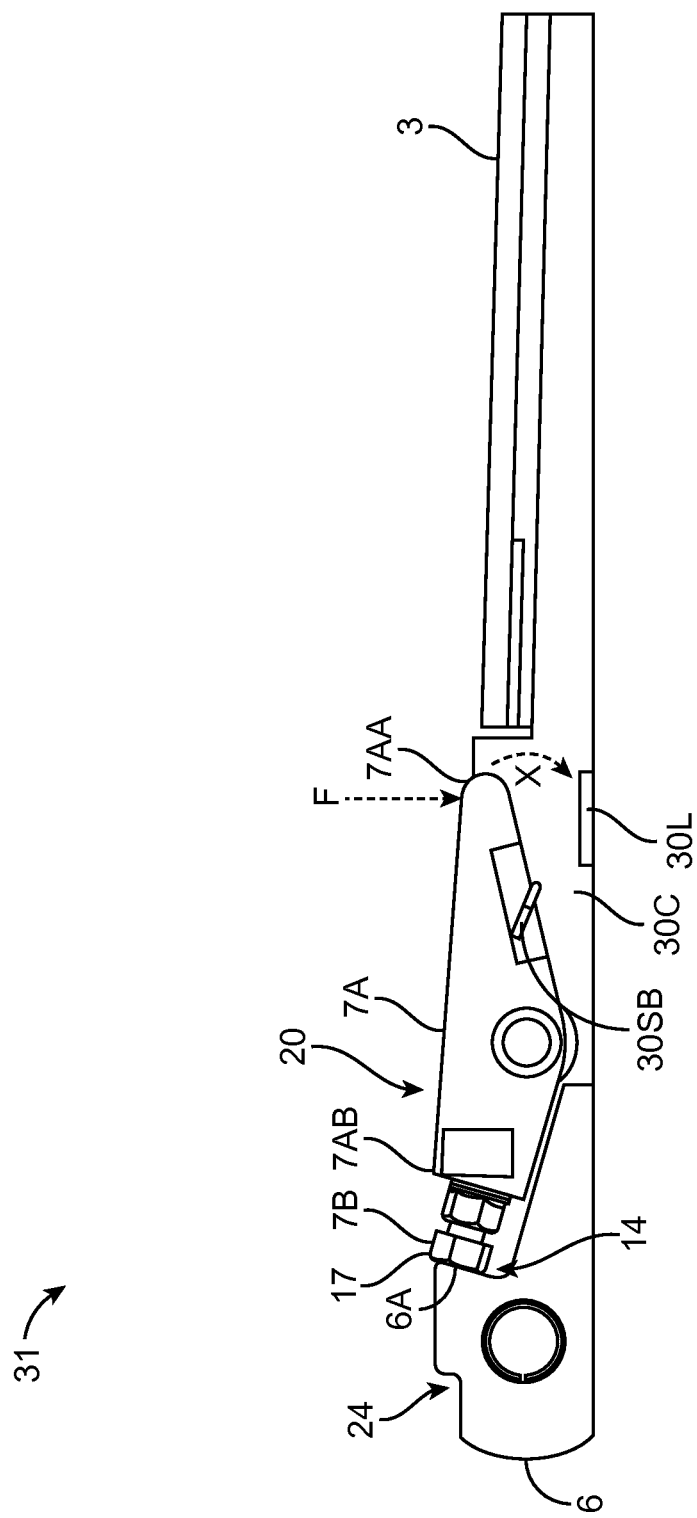
FIG. 8B illustrates a side view of the ramp when the ramp is maintained in the stowed position, in accordance with an embodiment of the invention.

FIG. 8B illustrates a side view of the ramp 3 when the ramp 3 is maintained in the stowed position by the locking mechanism 31, in accordance with an embodiment of the invention. Specifically, the ramp 3 is maintained in the stowed position when the head 17 of the adjustable screw 7B engages with the engagement surface 6A of the first recess 14 of the cam 6 to lock the locking mechanism 31. As shown in FIG. 8B, the head 17 of the adjustable screw 7B is in direct contact (e.g., flush) with the engagement surface 6A of the cam 6. The length of the arm 7A has been adjusted using the screw 7B such that there is no gap (i.e., no spacing) between the head 17 of the adjustable screw 7B and the engagement surface 6A of the cam 6 when the ramp 3 is maintained in the stowed position by the locking mechanism 31. As a result, the ramp 3 remains properly folded against the flipover 2.

The ramp 3 may be released (i.e., unlocked) from the stowed position by applying, and maintaining, a force F to the distal end 7AA of the adjustable locking arm 7A to push the distal end 7AA inside the channel 30C of the hinge member 11. The distal end 7AA rotates inside the channel 30C in direction X (e.g., clockwise in FIG. 8B) until the screw 7B is no longer in contact with the cam 6, allowing rotation of the hinge member 11 and the attached ramp 3. The distal end 7AA of the arm 7A contacts a stop member 30L of the hinge member 11, such that the stop member 30L limits the rotational range of the distal end 7AA.

Figure 9:
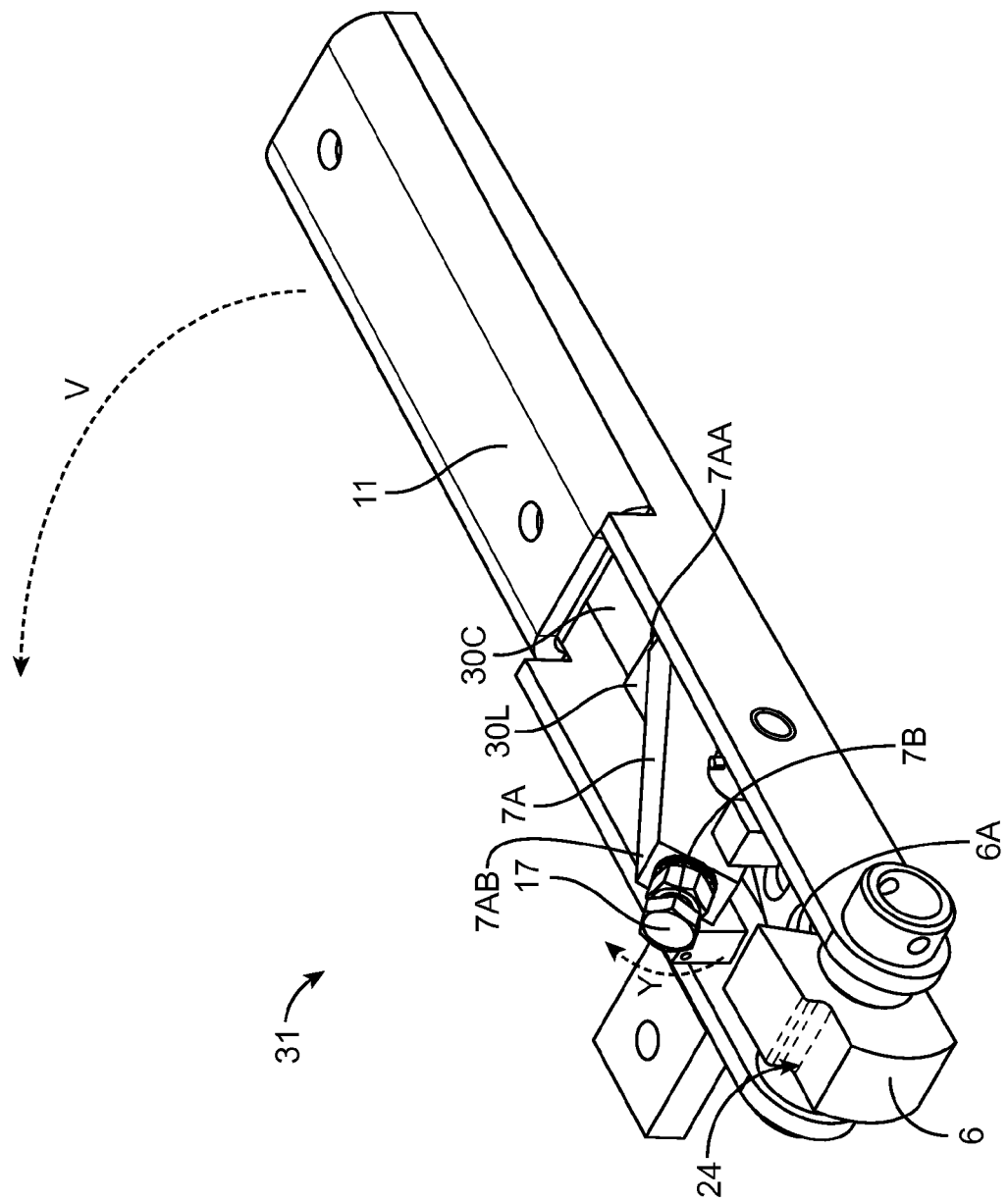
FIG. 9 illustrates a top perspective view of the locking assembly when the ramp is released from the stowed position, in accordance with an embodiment of the invention.

FIG. 9 illustrates a top perspective view of the locking assembly 31 when the locking arm 7A is unlocked such that the ramp 3 is released from the stowed position, in accordance with an embodiment of the invention. As the distal end 7AA of the adjustable locking arm 7A is pushed inside the channel 30C of the hinge member 11, the head 17 of the adjustable screw 7B disengages from the engagement surface 6A of the cam 6, and the adjustable screw 7B and the proximal end 7AB of the adjustable locking arm 7A rotate away from the cam 6 in direction Y (e.g., clockwise).

The ramp 3 is free to pivot relative to the flipover 2 when the locking assembly 31 is unlocked. For example, the ramp 3 may be positioned in the retention position by an operator rotating the ramp 3 in direction V (e.g., counter-clockwise) to a raised position, and ceasing the force F on the locking arm 7A, whereby the torsion spring 30S causes the arm 7A to pivot such that screw 7B engages locking engagement surface 6B of the cam 6, as shown by example in FIGS. 10, 11A and 11B.

Figure 10:
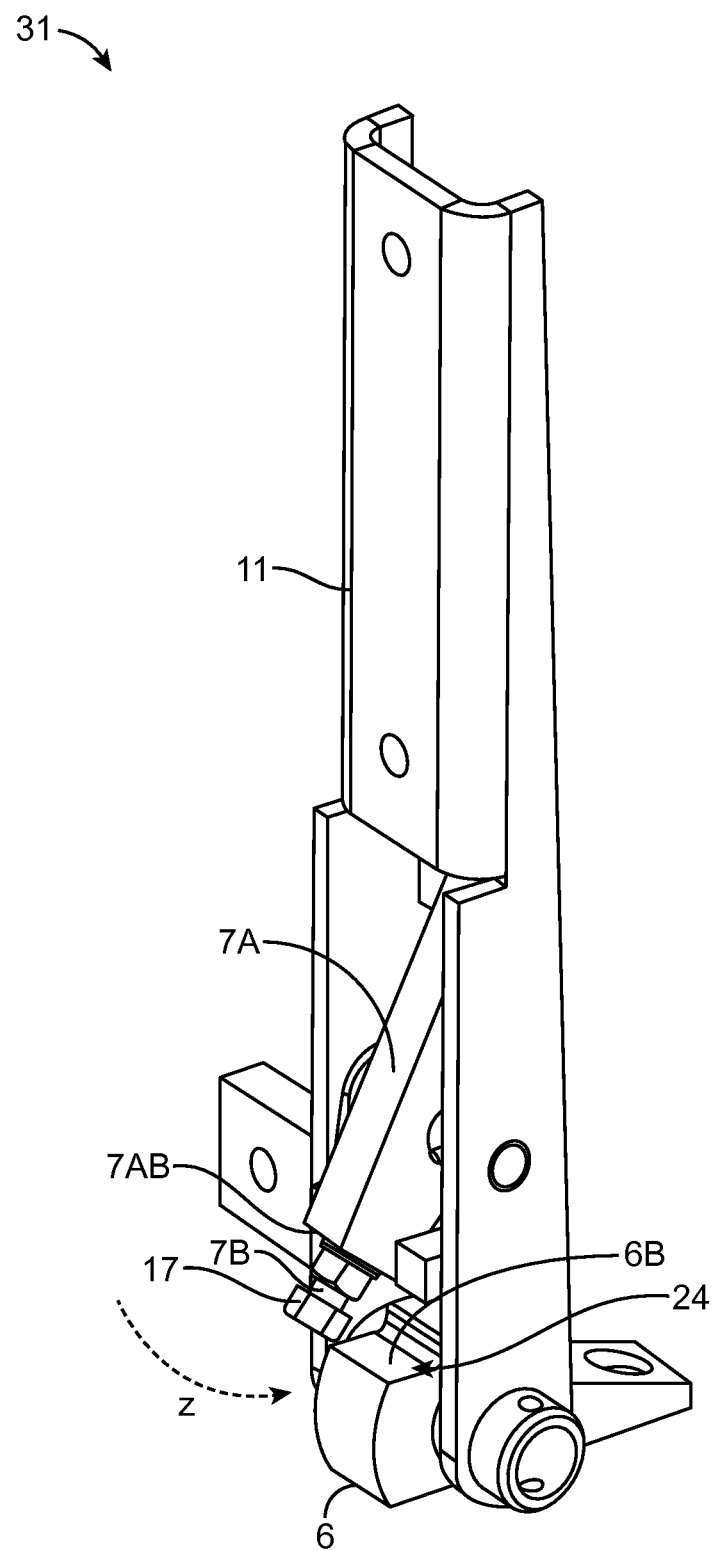
FIG. 10 illustrates a side perspective view of the locking assembly when the ramp is moved to the retention position, in accordance with an embodiment of the invention.

Specifically, FIG. 10 illustrates a side perspective view of the locking assembly 31 with the hinge member 11 (and the attached ramp 3) moved to the retention position, in accordance with an embodiment of the invention. The ramp 3 may be maintained in the retention position by removing the pressure F applied to the distal end 7AA of the adjustable locking arm 7A. When the pressure F is removed, the spring coil 30S biases the adjustable screw 7B and the proximal end 7AB of the adjustable locking arm 7A towards the cam member 6 in direction Z (e.g., counter-clockwise in FIG. 10), whereby the screw 7B of the arm 7A engages with engagement surface 6B of a second recess 24 of the cam 6 to maintain the ramp 3 in the retention position.

Figure 11A:
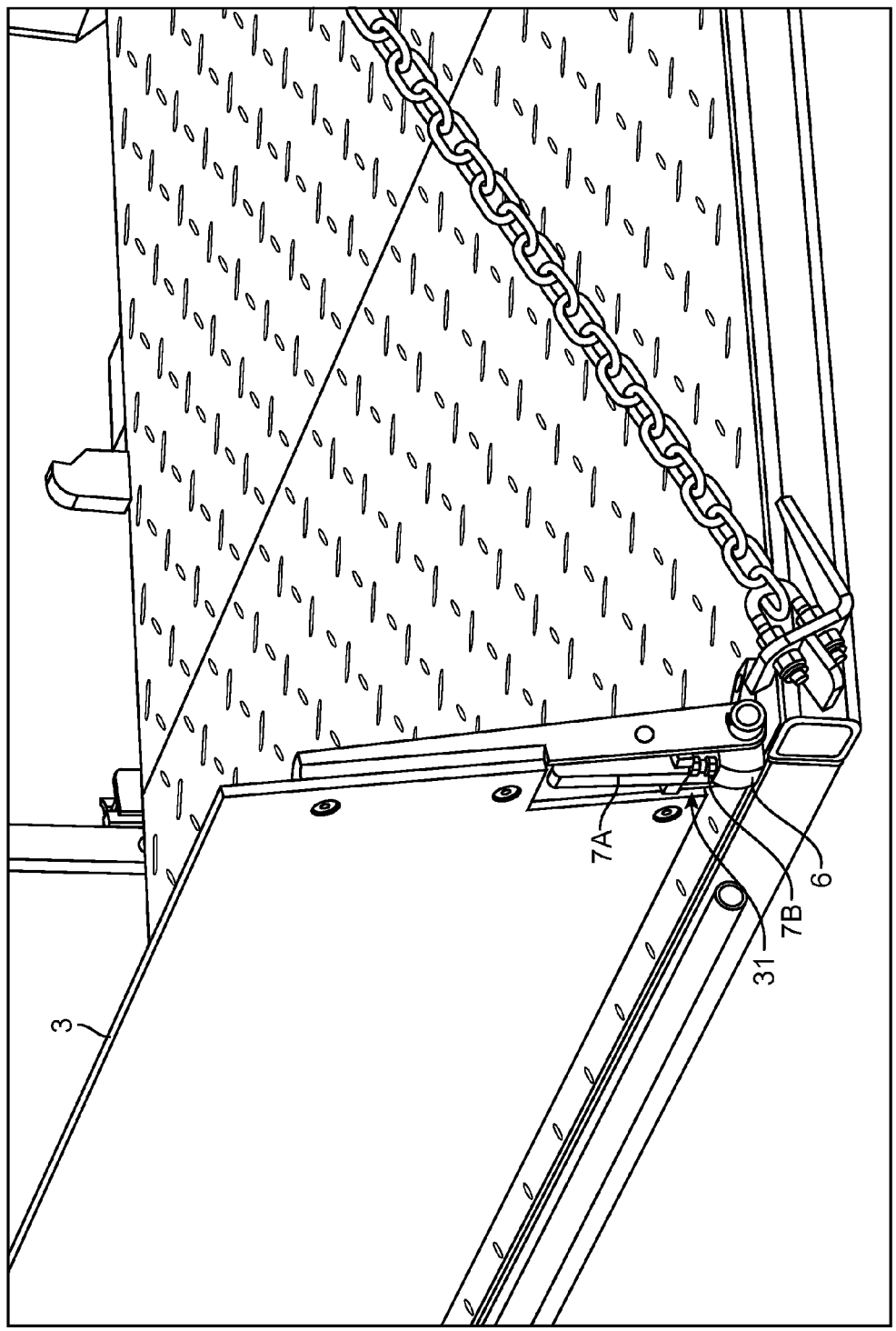
FIG. 11A illustrates a side perspective view of the ramp when the ramp is maintained in the retention position, in accordance with an embodiment of the invention.

FIG. 11A illustrates a side perspective view of the ramp 3 when the ramp 3 is maintained in the retention position, in accordance with an embodiment of the invention. In the retention position, the ramp 3 is substantially transverse to the flipover 2. The ramp 3 is maintained in the retention position when the adjustable screw 7B engages the second recess 24 of the cam 6, as shown in FIG. 11B.

Figure 11B:
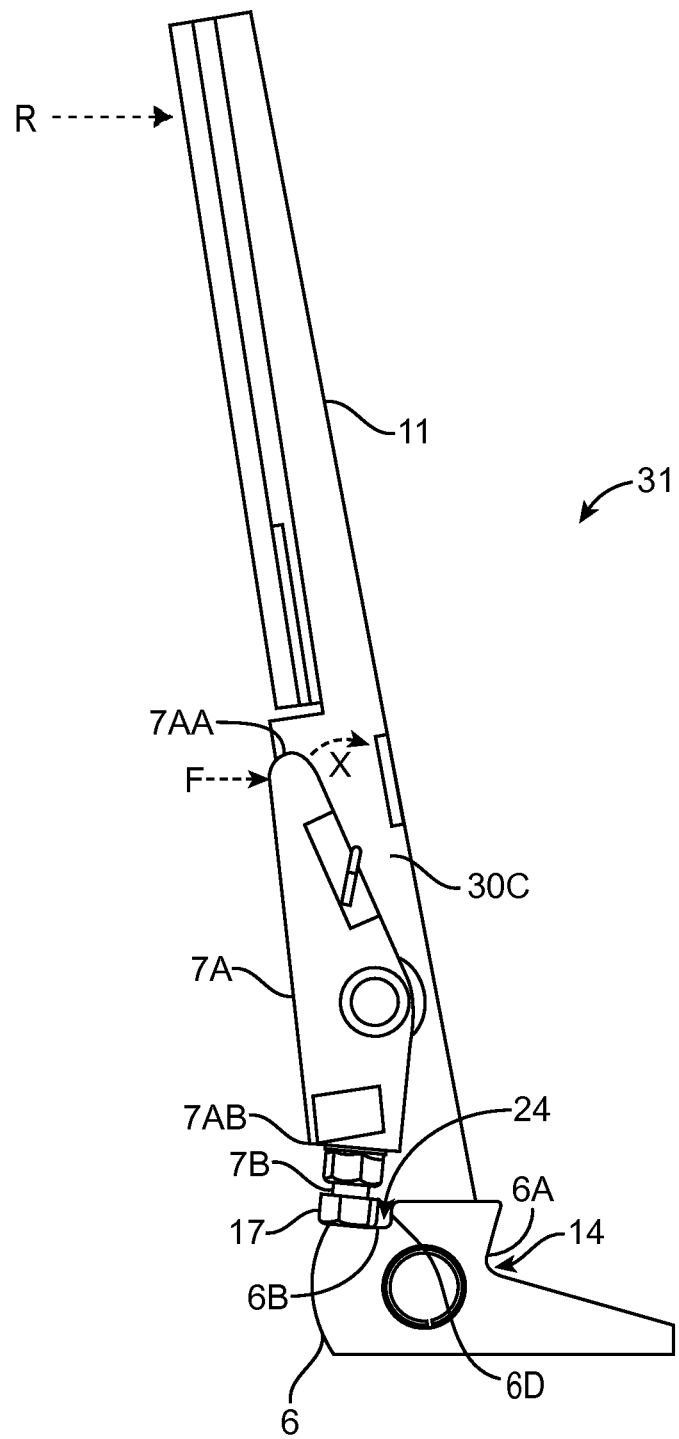
FIG. 11B illustrates a side view of the ramp when the ramp is maintained in the retention position, in accordance with an embodiment of the invention.

Specifically, FIG. 11B illustrates a side view of the ramp 3 when the ramp 3 is maintained in the retention position, in accordance with an embodiment of the invention. Specifically, the hinge member 11 supporting the ramp 3 is maintained in the retention position by the locking assembly 31 when the head 17 of the adjustable screw 7B engages with the engagement surface 6B of the second recess 24 of the cam 6. As shown in FIG. 11B, the head 17 of the adjustable screw 7B of the arm 7A is in direct contact (i.e., flush) with the engagement surface 6B of the cam 6. There is no gap (i.e., no spacing) between the head 17 of the adjustable screw 7B and the engagement surface 6B of the cam 6. In the retention position, the arm 7A maintains the hinge member 11 (and ramp 3) in a transverse angle relative the flipover 2, such that the ramp 3 cannot be rotated (e.g., to the ramp position) relative to the flipover 2 without disengaging the proximal end 7AB of the arm 7A from the recess 24.

The ramp 3 may be released from the retention position and rotated to the ramp position or the stowed position by applying a force F to the distal end 7AA of the adjustable locking arm 7A to push the distal end 7AA inside the channel 30C and unlock the locking arm 7A. The arm 7A pivots on axle 30L, such that distal end 7AA of the arm 7A rotates inside the channel 30C in direction X (e.g., clockwise) and the proximal end 7AB of the arm 7A rotates away and disengages from engagement surface 6B of the recess 24, while the force F is applied, as shown in FIG. 12.

In another embodiment, the ramp 3 is released from the retention position and rotated to the stowed position by applying a force R against the ramp 3 to rotate the ramp 3 to the stowed position relative to the flipover 2. The applied force R creates stress/tension between an engagement surface (e.g., engagement surface 6D) of the cam 6 and the adjustable screw 7B of the locking arm 7A. The stress/tension created overcomes the spring-loading biasing force of the spring 30S and rotates the distal end 7AA of the adjustable locking arm 7A inside the channel 30C in direction X (e.g., clockwise in FIG. 13B). The adjustable screw 7B and the proximal end 7AB of the adjustable locking arm 7A disengage from the recess 24 of the cam 6 as the distal end 7AA of the adjustable locking arm 7A rotates inside the channel 30C.

Figure 12:
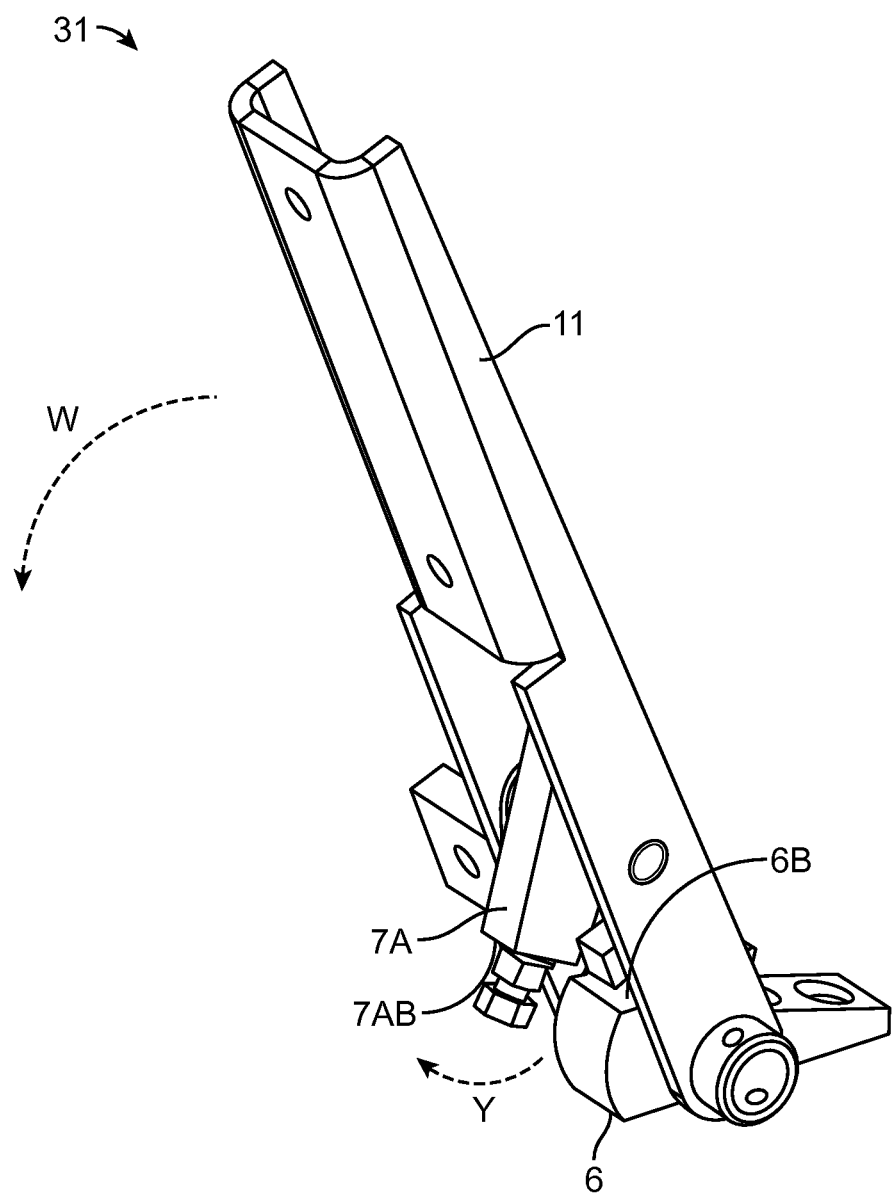
FIG. 12 illustrates a side perspective view of the locking assembly when the ramp is released from the retention position, in accordance with an embodiment of the invention.

FIG. 12 illustrates a side perspective view of the locking assembly 31 with the locking arm 7A unlocked, allowing the hinge member 11 (and the attached ramp 3) to rotate from the retention position towards the ramp position, as may be desired by an operator. In another example, with the locking arm 7A unlocked, the hinge member 11 (and the attached ramp 3) may also be rotated back toward the stowed position, as may be desired by an operator.

As the distal end 7AA of the adjustable locking arm 7A rotates inside the channel 30C of the hinge member 11, the head 17 of the adjustable screw 7B disengages from the engagement surface 6B of the cam 6, and the adjustable screw 7B and the proximal end 7AB of the adjustable locking arm 7A rotate away from the cam 6 in direction Y (e.g., clockwise in FIG. 12).

The hinge member 11 (and ramp 3) can pivot on pivot member 12 relative to the flipover 2 when the locking arm 7A is unlocked. For example, the ramp 3 may be positioned in the ramp position by rotating the ramp 3 in direction W to a lowered position. As another example, the ramp 3 may be positioned in the stowed position by rotating the ramp 3 in a direction opposite of W, as noted above.

FIG. 13A illustrates a top perspective view of the ramp 3 in the ramp position and maintained in that position by the locking arm 7A, in accordance with an embodiment of the invention. The ramp 3 is substantially aligned with the flipover 2 when the ramp 3 is in the ramp position. The ramp 3 is maintained in the ramp position when the force F is removed, allowing the spring 30S to pivot the locking arm 7A on axle 30L, such that adjustable screw 7B may essentially engage with engagement surface 6C of the cam 6 (FIG. 13B).

Figure 13B:
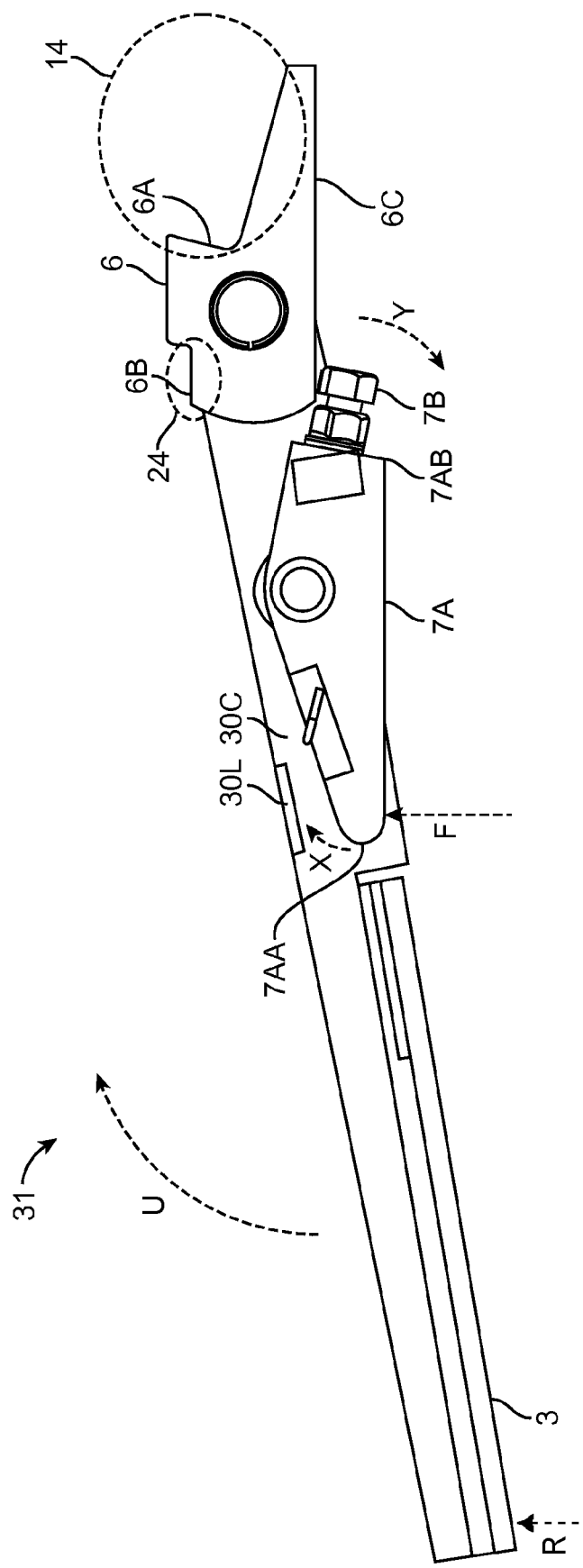
FIG. 13B illustrates a side view of the ramp when the ramp is maintained in the ramp position, in accordance with an embodiment of the invention.

FIG. 13B illustrates a side view of the ramp 3 maintained in the ramp position when the locking arm 7A is locked, in accordance with an embodiment of the invention. The adjustable screw 7B is positioned underneath the cam 6 when the ramp 3 is rotated to the ramp position. When the pressure F is removed from the distal end 7AA of the adjustable locking arm 7A, the spring coil 30S biases the adjustable screw 7B and the proximal end 7AB of the adjustable locking arm 7A towards the cam 6 to maintain the ramp 3 in the ramp position. In one embodiment, the adjustable screw 7B rests against engagement surface 6C of the cam 6, as shown in FIG. 13B.

In one embodiment, the ramp 3 is released from the ramp position by applying a force F to the distal end 7AA of the adjustable locking arm 7A to overcome the spring-loading biasing force of the spring 30S and pivot the arm 7A on the axle 30L, such that the distal end 7AA rotates inside the channel 30C. As the distal end 7AA of the adjustable locking arm 7A rotates inside the channel 30C in direction X (e.g., clockwise in FIG. 13B), the adjustable screw 7B and the proximal end 7AB of the adjustable locking arm 7A rotates away from the cam 6 in direction Y (e.g., clockwise in FIG. 13B).

The ramp 3 is free to rotate relative to the flipover 2 when the locking arm 7A is unlocked from the cam 6. For example, the ramp 3 may be moved to the retention position or the stowed position by rotating the ramp 3 in direction U relative to the flipover 2.

In another embodiment, the ramp 3 is released from the ramp position by applying a force R against the ramp 3 to rotate the ramp 3 to the retention position or the stowed position. As the ramp 3 rotates in direction U to the retention position or the stowed position, the applied force R creates stress/tension between the engagement surface 6C of the cam 6 and the adjustable screw 7B of the locking arm 7A. The stress/tension created overcomes the spring-loading biasing force of the spring 30S and rotates the distal end 7AA of the adjustable locking arm 7A inside the channel 30C in direction X (e.g., clockwise in FIG. 13B). The adjustable screw 7B and the proximal end 7AB of the adjustable locking arm 7A rotate away from the engagement surface 6C of the cam 6 in direction Y (e.g., clockwise in FIG. 13B) as the distal end 7AA of the adjustable locking arm 7A rotates inside the channel 30C.

Figure 14:
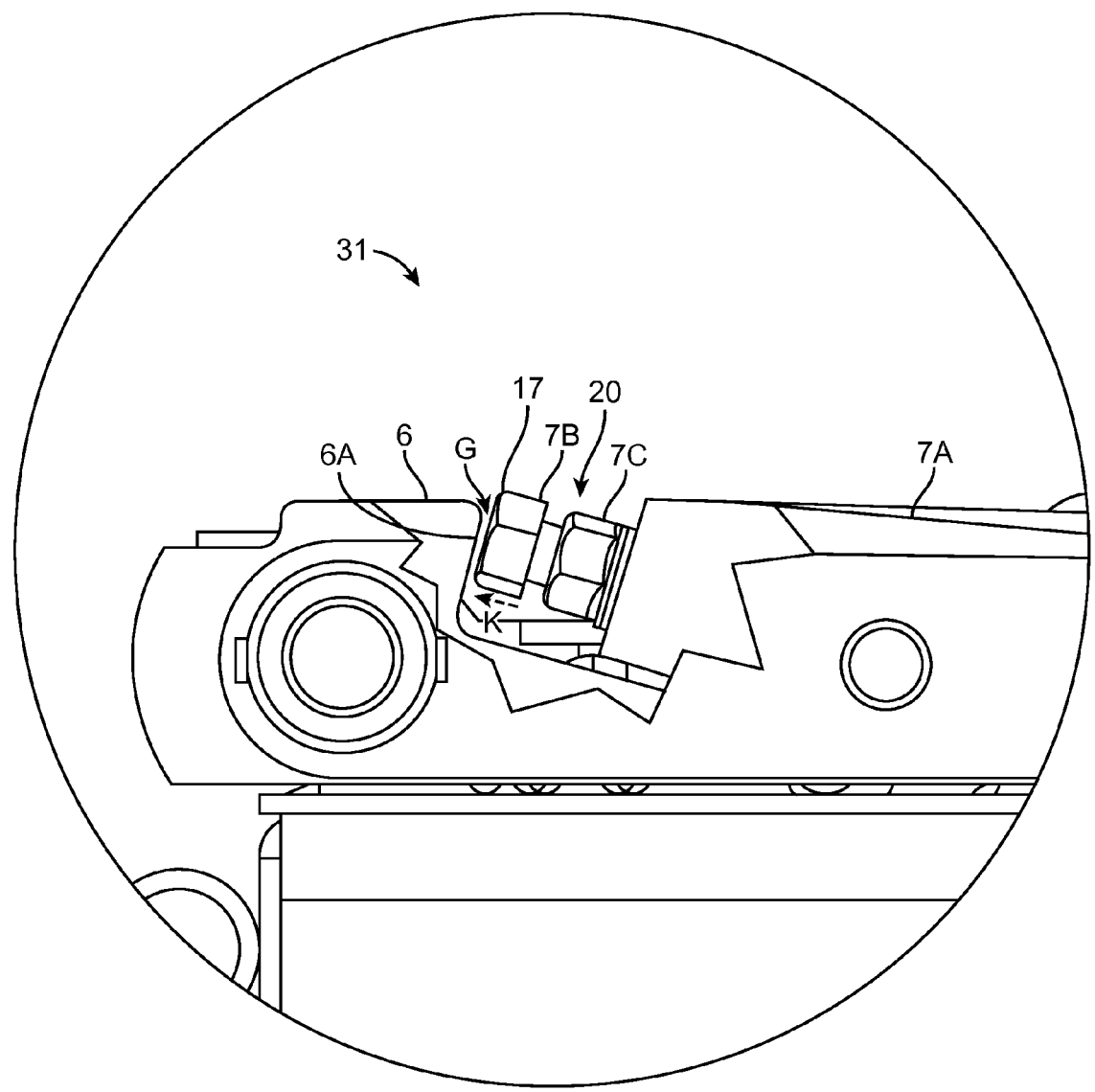
FIG. 14 illustrates a side view of the locking mechanism when the ramp is maintained in the stowed position, in accordance with an embodiment of the invention.

FIG. 14 illustrates a side view of the locking mechanism 20 of the locking assembly 31 when the locking arm 7A engages engagement surface 6A of the cam 6 to maintain the ramp 3 in the stowed position, in accordance with an embodiment of the invention. Repeated engagement of the adjustable screw 7B and the adjustable locking arm 7A with the cam 6 to maintain the ramp 3 in a selected position causes wear and tear to the adjustable screw 7B of the adjustable locking arm 7A, or the cam 6. Further, repeatedly disengaging the adjustable screw 7B and the adjustable locking arm 7A from the cam 6 to release the ramp 3 from a selected position may also cause wear and tear to the adjustable screw 7B, the adjustable locking arm 7A, or the cam 6.

As a result of wear and tear to the locking mechanism 20, a gap G may develop between the cam 6 and the adjustable screw 7B when the adjustable locking arm 7A is biased by the spring coil 30S to lock the arm 7A and maintain the ramp 3 in a selected position, such as the stowed position. FIG. 14 shows a gap G between the engagement surface 6A of the cam 6 and the head 17 of the adjustable screw 7B when the adjustable locking arm 7A is biased by the spring coil 30S to lock the arm 7A and maintain the ramp 3 in the stowed position. The gap G may be due to said wear and tear, or other reasons, such as needs to adjusting the length of the locking arm 7A to maintain a proper engagement between the arm 7A and the cam 6. The gap G prevents adjustable screw 7B from properly engaging with the engagement surface 6A of the cam 6. As a result, the ramp 3 may jut out relative to the flipover 2 when the lift platform 100 is in the stowed position, as shown in FIG. 5C.

According to embodiments of the invention, the gap G may be minimized or closed by adjusting the adjustable screw 7B. Specifically, the securing nut 7C is loosened to allow the body 16 of the adjustable screw 7B to be partially unscrewed from the cavity 7AH (FIG. 7I) of the adjustable locking arm 7A. As the body 16 of the adjustable screw 7B is unscrewed, the head 17 of the adjustable screw 7B moves towards the cam 6 in direction K to minimize or close the gap G (essentially lengthening the arm 7A). The adjustable screw 7B is adjusted until the head 17 of the adjustable screw 7B is in direct contact with the cam 6, and the ramp 3 is properly folded against the flipover 2 (as in FIGS. 4A-4B). Once the gap G is closed, the securing nut 7C is tightened to secure the adjustable screw 7B to the adjustable locking arm 7A. Closing the gap G reduces/eliminates the ramp 3 from jutting out relative to the flipover 2 when the ramp 3 is maintained in the stowed position.

Figure 15:
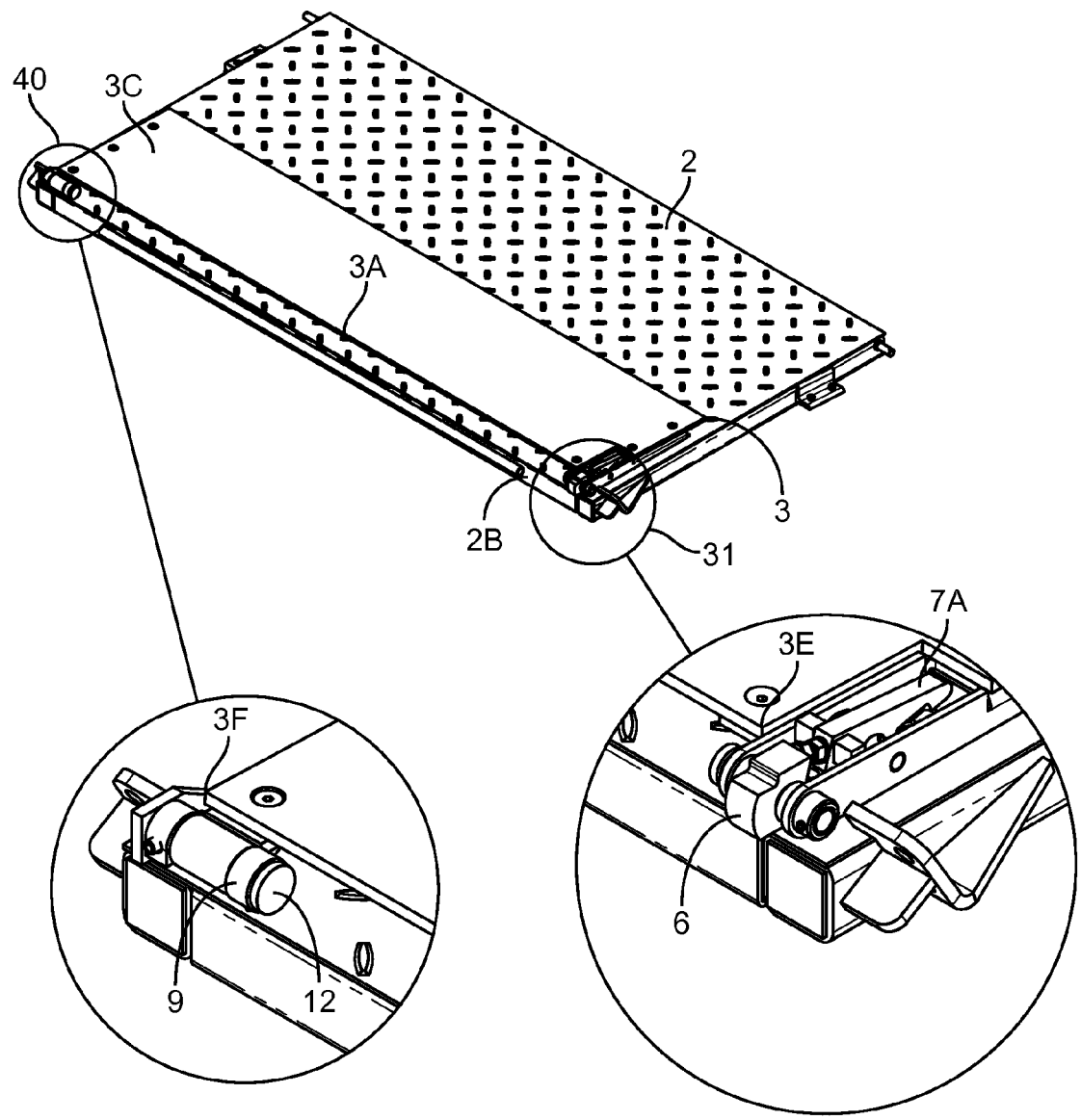
FIG. 15 illustrates a top perspective view of an example locking assembly and an example hinge assembly that pivotally couples the ramp to the flipover, in accordance with an embodiment of the invention.

FIG. 15 illustrates a top perspective view of an example locking assembly 31 and a hinge assembly 40 that pivotally couple the ramp 3 to the flipover 2, in accordance with an embodiment of the invention. In one embodiment, the first edge 3A of the ramp 3 is pivotally coupled to the second edge 2B of the flipover 2 via a locking assembly 31 at one end 3E and a hinge assembly 40 at opposing end 3F of the ramp 3 (the locking assembly 31 and the hinge assembly 40 are disposed at opposite ends 3E of the first edge 3A). In this embodiment, the lift gate 10 includes one locking assembly for the ramp 3.

The hinge assembly 40 comprises a hinge member 9 that is coupled to the top side 3D of the ramp 3 using at least one fastener 8. The hinge assembly 40 further includes at least pivot member 12 that enables the ramp 3 to pivot relative to the flipover 2.

Figure 16:
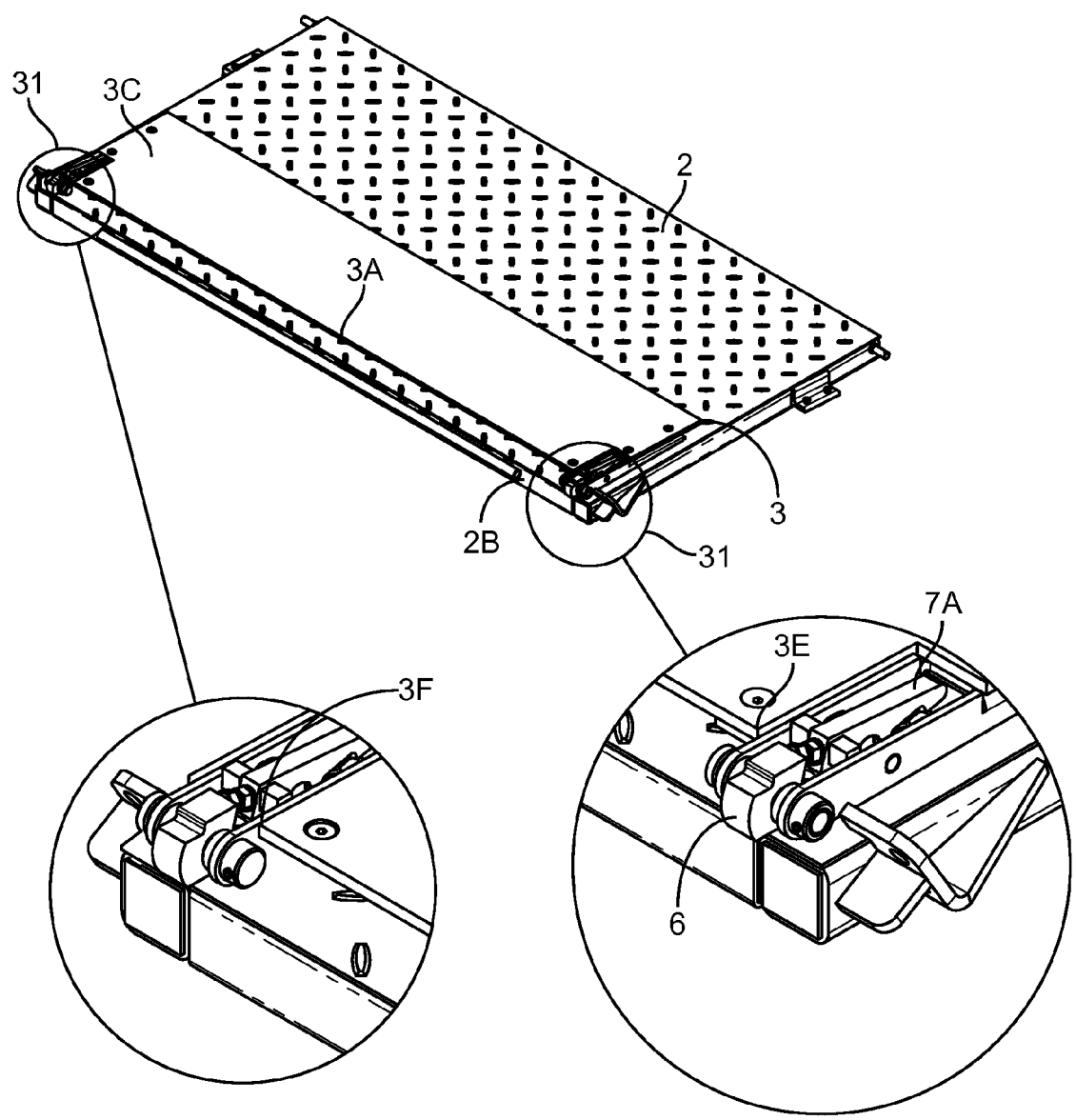
FIG. 16 illustrates a top perspective view of example locking assemblies that pivotally couple the ramp to the flipover, in accordance with an embodiment of the invention.

FIG. 16 illustrates another embodiment of a lift gate including a pair of locking assemblies for the ramp 3, according to an embodiment of the invention. FIG. 16 shows locking assemblies 31 that pivotally couple the ramp 3 to the flipover 2, wherein the first edge 3A of the ramp 3 is pivotally coupled to the second edge 2B of the flipover 2 via a pair of locking assemblies 31, wherein a locking assembly 31 is disposed at one end 3E of the first edge 3A of the ramp 3, and another locking assembly 31 is disposed at one end 3F of the second edge 3A of the ramp 3.

In another embodiment of the invention, an adjusting mechanism may include at least one adjustable screw 7B is driven inside the cam 6 instead. In yet another embodiment, the proximal end 7AB of the adjustable locking arm 7A includes a first adjustable screw 7B, and the cam 6 also has at least one adjustable screw 7B. Embodiments of the invention are useful in different types of lift gate systems.

The present invention has been described in considerable detail with reference to certain preferred versions thereof; however, other versions are possible. Therefore, the spirit and scope of the appended claims should not be limited to the description of the preferred versions contained herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A locking assembly for a ramp of a lift gate, the locking assembly comprising:
   an elongated adjustable locking arm, wherein the locking arm is pivotably disposed on a pivot point relative to the ramp, the locking arm including an adjustment mechanism for adjusting selective engagement of the locking arm with the ramp;
   a spring for spring loading the locking arm, wherein a biasing tension in the spring urges a proximal end of the locking arm to pivotably engage with a cam portion of the ramp to maintain the ramp in a selected position; and
   a coupling member for rotatably coupling the ramp to a lift platform section of the lift gate, the coupling member including a channel in which the locking arm is pivotably disposed on a pivot axle along the length of the locking arm, such that the locking arm can pivot about the pivot axle for selectively engaging the cam portion;
   wherein the cam portion has multiple engagement surfaces for individually engaging with the locking arm, such that selective engagement of the locking arm with each engagement surface of the cam portion maintains the ramp in a selected position;
   wherein the adjustment mechanism is disposed at said proximal end of the locking arm for adjusting the length of the locking arm, such that the adjustment mechanism allows selective adjustment of the length of a portion of the locking arm between said pivot point and the cam portion, to reduce a gap between the proximal end of the locking arm and an engagement surface of the cam portion;
   wherein the adjusting mechanism comprises an adjustable screw threadedly disposed on said proximal end of the locking arm for engaging the cam portion;
   wherein the length of the locking arm can be increased by partially unscrewing the adjustable screw out of said proximal end of the locking arm; and
   wherein the length of the locking arm can be decreased by partially screwing the adjustable screw into said proximal end of the locking arm.

2. The locking assembly of claim 1, wherein:
   the locking arm is pivotably disposed on said pivot axle along the length of the locking arm between said proximal end and a distal end of the locking arm; and
   upon exerting a force on the distal end of the locking arm to overcome the tension in the spring, the locking arm pivots to disengage said proximal end of the locking arm from the cam portion and allows the ramp to be rotated relative to the lift platform section.

3. The locking assembly of claim 2, wherein:
   when the proximal end of the locking arm engages with a first engagement surface of the cam portion, the ramp is maintained in a stowed position by the locking arm, such that the ramp is folded against a section of the lift platform section.

4. The locking assembly of claim 3, wherein:
   when the proximal end of the locking arm engages with a second engagement surface of the cam portion, the ramp is maintained in a retention position by the locking arm, such that the ramp is substantially transverse to the lift platform section.

5. The locking assembly of claim 4, wherein:
   when the proximal end of the locking arm engages with a third engagement surface of the cam portion, the ramp is maintained in a ramp position, such that the ramp is substantially aligned with the lift platform section.

6. The locking assembly of claim 2, wherein:
upon exerting a force on the distal end of the locking arm to overcome the tension in the spring, the locking arm pivots to disengage said proximal end of the locking arm from the cam portion and allows the ramp to be rotated relative to the lift platform section between said stowed position, retention position and ramp position.

7. The locking assembly of claim 6, wherein:
the distal end of the locking arm rotates into said channel as the proximal end of the locking arm rotates away to disengage the cam portion due to exertion of said force on the distal end of the locking arm; and
upon removing said force on the distal end of the locking arm, the spring pivots the locking arm to rotate said proximal end into engagement with the cam portion and maintain the ramp in a selected position relative to the lift platform section.

8. The locking assembly of claim 7, wherein:
a bottom of the channel limits the rotational range of the distal end of the locking arm.

9. The locking assembly of claim 1, wherein:
when the proximal end of the locking arm engages with a first engagement surface of the cam portion, the ramp is maintained in a stowed position by the locking arm, such that the ramp is folded against a section of the lift platform section; and
the adjustment mechanism allows adjusting the length of the locking arm for engaging the cam portion to maintain the ramp fully folded against the lift platform section in said stowed position of the ramp.

10. A lift gate system, comprising:
a lift platform section;
a ramp, wherein the ramp is rotatably coupled to the lift platform section;
a lifting mechanism for supporting and moving the lift platform section; and
a locking assembly for maintaining the ramp in a selected position relative to the lift platform section, wherein the locking assembly comprises:
an elongated adjustable locking arm, wherein the locking arm is pivotably disposed on a pivot point relative to the ramp, wherein said pivot point is between a proximal end and a distal end of the locking arm, the locking arm further including an adjustment mechanism for adjusting the length of the locking arm;
a spring for spring loading the locking arm, wherein a biasing tension in the spring urges a proximal end of the locking arm to pivotably engage with a cam portion of the ramp to maintain the ramp in a selected position; and
a coupling member for rotatably coupling the ramp to the lift platform section, the coupling member including a channel in which the locking arm is pivotably disposed on a pivot axle along the length of the locking arm, such that the locking arm can pivot about the pivot axle for selectively engaging the cam portion;
wherein the cam portion has multiple engagement surfaces for individually engaging with the locking arm, such that selective engagement of the locking arm with each engagement surface of the cam portion maintains the ramp in a selected position;
wherein the adjustment mechanism is disposed at said proximal end of the locking arm for adjusting the length of the locking arm, such that the adjustment mechanism allows selective adjustment of the length of a portion of the locking arm between said pivot point and the cam portion, to reduce a gap between the proximal end of the locking arm and an engagement surface of the cam portion;
wherein the adjustment mechanism comprises an adjustable length member disposed on said proximal end of the locking arm for engaging the cam portion, such that the length of the locking arm can be increased by partially lengthening the adjustable length member at said proximal end of the locking arm, and the length of the locking arm can be decreased by partially shortening the adjustable length member at said proximal end of the locking arm.

11. The lift gate system of claim 10, wherein:
the locking arm is pivotably disposed on said pivot axle along the length of the locking arm between said proximal end and a distal end of the locking arm; and
upon exerting a force on the distal end of the locking arm to overcome the tension in the spring, the locking arm pivots to disengage said proximal end of the locking arm from the cam portion and allows the ramp to be rotated relative to the lift platform section.

12. The lift gate system of claim 11, wherein:
when the proximal end of the locking arm engages with a first engagement surface of the cam portion, the ramp is maintained in a stowed position by the locking arm, such that the ramp is folded against a section of the lift platform section.

13. The lift gate system of claim 12, wherein:
when the proximal end of the locking arm engages with a second engagement surface of the cam portion, the ramp is maintained in a retention position by the locking arm, such that the ramp is substantially transverse to the lift platform section.

14. The lift gate system of claim 13, wherein:
when the proximal end of the locking arm engages with a third engagement surface of the cam portion, the ramp is maintained in a ramp position, such that the ramp is substantially aligned with the lift platform section.

15. The lift gate system of claim 11, wherein:
upon exerting a force on the distal end of the locking arm to overcome the tension in the spring, the locking arm pivots to disengage said proximal end of the locking arm from the cam portion and allows the ramp to be rotated relative to the lift platform section between said stowed position, retention position and ramp position.

16. The lift gate system of claim 15, wherein:
the distal end of the locking arm rotates into said channel as the proximal end of the locking arm rotates away to disengage the cam portion due to exertion of said force on the distal end of the locking arm; and
upon removing said force on the distal end of the locking arm, the spring pivots the locking arm to rotate said proximal end into engagement with the cam portion and maintain the ramp in a selected position relative to the lift platform section.

17. The lift gate system of claim 16, wherein:
a bottom of the channel limits the rotational range of the distal end of the locking arm.

18. The lift gate system of claim 10, wherein:
when the proximal end of the locking arm engages with a first engagement surface of the cam portion, the ramp is maintained in a stowed position by the locking arm, such that the ramp is folded against a section of the lift platform section; and the adjustment mechanism allows adjusting the length of the locking arm for engaging the cam portion to maintain the ramp fully folded against the lift platform section in said stowed position of the ramp.

19. The lift gate system of claim 18, wherein:

the adjustable length member comprises an adjustable screw threadedly disposed on said proximal end of the locking arm for engaging the cam portion;

the length of the locking arm can be increased by partially unscrewing the adjustable screw out of said proximal end of the locking arm; and the length of the locking arm can be decreased by partially screwing the adjustable screw into said proximal end of the locking arm.

20. A method, comprising:

maintaining a ramp of a lift gate in a selected position by engaging an elongated adjustable locking arm with a cam portion of the ramp, the locking arm including an adjustment mechanism for adjusting selective engagement of the locking arm with the ramp;

wherein the locking arm is spring loaded by a spring having a biasing tension that urges a proximal end of the locking arm to pivotably engage with the cam portion to maintain the ramp in a selected position;

wherein the cam portion has multiple engagement surfaces for individually engaging with the locking arm, such that selective engagement of the locking arm with each engagement surface of the cam portion maintains the ramp in a selected position;

wherein the locking arm is disposed in a coupling member for rotatably coupling the ramp to a lift platform section of the lift gate, the coupling member including a channel in which the locking arm is pivotably disposed on a pivot axle along the length of the locking arm, such that the locking arm can pivot about the pivot axle for selectively engaging the cam portion;

wherein adjustment mechanism is disposed at said proximal end of the locking arm for adjusting the length of the locking arm, such that the adjustment mechanism allows selective adjustment of the length of a portion of the locking arm between said pivot point and the cam portion, to reduce a gap between the proximal end of the locking arm and an engagement surface of the cam portion;

wherein the adjusting mechanism comprises an adjustable screw threadedly disposed on said proximal end of the locking arm for engaging the cam portion;

wherein the length of the locking arm can be increased by partially unscrewing the adjustable screw out of said proximal end of the locking arm; and wherein the length of the locking arm can be decreased by partially screwing the adjustable screw into said proximal end of the locking arm.

21. The method of claim 20, further comprising:

rotatably coupling the ramp to a lift platform section of the lift gate via a coupling member, the coupling member including a channel in which the locking arm is pivotably disposed on a pivot axle along the length of the locking arm between said proximal end and a distal end of the locking arm, such that the locking arm can pivot about the pivot axle for selectively engaging the cam portion;

wherein upon exerting a force on the distal end of the locking arm to overcome the tension in the spring, the locking arm pivots to disengage said proximal end of the locking arm from the cam portion and allows the ramp to be rotated relative to the lift platform section.

22. The method of claim 21, further comprising maintaining the ramp in a stowed position by engaging the proximal end of the locking arm with a first engagement surface of the cam portion, such that the ramp is folded against a section of the lift platform section;

maintaining the ramp in a retention position by engaging the proximal end of the locking arm with a second engagement surface of the cam portion, such that the ramp is substantially transverse to the lift platform section; and maintaining the ramp in a ramp position by engaging the proximal end of the locking arm engages with a third engagement surface of the cam portion, such that the ramp is substantially aligned with the lift platform section.

23. The method of claim 21, further comprising:

exerting a force on the distal end of the locking arm to overcome the tension in the spring, such that the locking arm pivots to disengage said proximal end of the locking arm from the cam portion and allows the ramp to be rotated relative to the lift platform section between said stowed position, retention position and ramp position;

wherein the distal end of the locking arm rotates into said channel as the proximal end of the locking arm rotates away to disengage the cam portion due to exertion of said force on the distal end of the locking arm; and wherein upon removing said force on the distal end of the locking arm, the spring pivots the locking arm to rotate said proximal end into engagement with the cam portion and maintain the ramp in a selected position relative to the platform section.

24. The method of claim 21, further comprising:

adjusting the length of the locking arm using the adjustment mechanism.

* * * * *